United States Patent
Kotthoff

(10) Patent No.: US 8,402,659 B2
(45) Date of Patent: Mar. 26, 2013

(54) SINTERED GEAR ELEMENT FEATURING LOCALLY SELECTIVE SURFACE COMPRESSION

(75) Inventor: Gerhard Kotthoff, Remscheid (DE)

(73) Assignee: GKN Sinter Metals Holding GmbH, Radevormwald (DE)

( * ) Notice: Subject to any disclaimer, the term of this patent is extended or adjusted under 35 U.S.C. 154(b) by 684 days.

(21) Appl. No.: 11/953,137

(22) Filed: Dec. 10, 2007

(65) Prior Publication Data

US 2008/0166579 A1 Jul. 10, 2008

Related U.S. Application Data

(63) Continuation of application No. PCT/EP2006/005468, filed on Jun. 8, 2006.

(51) Int. Cl.
*B21K 1/30* (2006.01)

(52) U.S. Cl. .......... 29/893.32; 29/893.3; 29/893.36

(58) Field of Classification Search .......... 29/893, 29/893.3, 893.32–37; 419/43, 69
See application file for complete search history.

(56) References Cited

U.S. PATENT DOCUMENTS

| | | | |
|---|---|---|---|
| 2,461,734 A * | 2/1949 | Hartley et al. ........ | 266/126 |
| 2,542,912 A | 2/1951 | Edwin | |
| 2,561,579 A * | 7/1951 | Lenel ........ | 428/550 |
| 3,037,400 A | 6/1962 | Sundt | |
| 3,043,164 A | 7/1962 | Sundt | |
| 4,059,879 A | 11/1977 | Chmura et al. | |
| 4,666,665 A | 5/1987 | Hornsby et al. | |
| 4,708,912 A | 11/1987 | Huppmann | |
| 4,739,644 A | 4/1988 | Maki et al. | |
| 5,286,323 A | 2/1994 | Bagley | |
| 5,308,556 A | 5/1994 | Bagley | |
| 5,308,702 A | 5/1994 | Furukimi et al. | |
| 5,453,242 A | 9/1995 | Knoess | |
| 5,476,632 A | 12/1995 | Shivanath et al. | |
| 5,540,883 A | 7/1996 | Jones et al. | |
| 5,613,180 A | 3/1997 | Kosco | |
| 5,659,955 A | 8/1997 | Plamper | |
| 5,711,187 A | 1/1998 | Cole et al. | |
| 5,729,822 A | 3/1998 | Shivanath et al. | |
| 5,754,937 A | 5/1998 | Jones et al. | |

(Continued)

FOREIGN PATENT DOCUMENTS

| | | |
|---|---|---|
| DE | 3 325 037 | 7/1984 |
| EP | 371340 B1 * | 4/1994 |

(Continued)

OTHER PUBLICATIONS

Kotthoff, Gerhard, "Neue Verfahren zur Tragfähigkeitssteigerung von gesinterten Zahnrädern", 2003, Ch.5-6, pp. 44-125, translation provided by applicant.*

(Continued)

*Primary Examiner* — David Bryant
*Assistant Examiner* — Ryan J Walters
(74) *Attorney, Agent, or Firm* — Woodcock Washburn LLP

(57) ABSTRACT

A method for producing an at least partially surface-densified metallic toothed element comprising a densified sintering material, in order to improve a strength profile, a preform of the toothed element being produced with a locally selective oversize profile relative to a final size of the toothed element and being rolled to the final size by means of at least one rolling die, the toothed element being densified in locally varied manner at least in the region of at least one flank and/or one root of a tooth of the toothed element to produce a densified outer layer.

15 Claims, 12 Drawing Sheets

U.S. PATENT DOCUMENTS

| | | | |
|---|---|---|---|
| 5,884,527 A * | 3/1999 | Cole et al. | 74/434 |
| 5,903,815 A | 5/1999 | Scott | |
| 5,972,132 A | 10/1999 | Cadle | |
| 6,017,489 A | 1/2000 | Woolf et al. | |
| 6,044,555 A | 4/2000 | Jacob et al. | |
| 6,151,778 A | 11/2000 | Woolf et al. | |
| 6,151,941 A * | 11/2000 | Woolf et al. | 72/102 |
| 6,168,754 B1 | 1/2001 | Woolf et al. | |
| 6,170,156 B1 | 1/2001 | Lev et al. | |
| 6,193,927 B1 | 2/2001 | Jones et al. | |
| 6,357,272 B1 | 3/2002 | Sandner | |
| 6,416,262 B1 | 7/2002 | Ishimaru et al. | |
| 6,464,739 B2 | 10/2002 | Yoshida et al. | |
| 6,517,772 B1 | 2/2003 | Woolf | |
| 6,696,014 B2 | 2/2004 | Nakamura et al. | |
| 6,899,846 B2 | 5/2005 | Woolf | |
| 6,974,012 B2 | 12/2005 | Rau et al. | |
| 7,020,972 B2 | 4/2006 | Graf et al. | |
| 7,025,928 B2 | 4/2006 | Hodjat | |
| 7,111,395 B2 | 9/2006 | Sandner | |
| 7,578,963 B2 | 8/2009 | Trasorras et al. | |
| 2002/0048526 A1 | 4/2002 | Nakamura et al. | |
| 2003/0183479 A1 | 10/2003 | Rau et al. | |
| 2004/0016123 A1 | 1/2004 | Sandner | |
| 2004/0062673 A1 | 4/2004 | Trasorras et al. | |
| 2004/0141865 A1 | 7/2004 | Keshavan et al. | |
| 2004/0219051 A1 | 11/2004 | Sonti et al. | |
| 2005/0272545 A1 * | 12/2005 | Yamanishi et al. | 474/152 |
| 2006/0024189 A1 | 2/2006 | Trasorras et al. | |

FOREIGN PATENT DOCUMENTS

| | | |
|---|---|---|
| EP | 0 600 421 A1 | 6/1994 |
| EP | 0 552 272 B1 | 12/1994 |
| EP | 1 268 102 B1 | 5/2006 |
| GB | 1 125 952 | 9/1968 |
| GB | 1 532 641 | 11/1978 |
| GB | 2 250 227 | 6/1992 |

OTHER PUBLICATIONS

Donald R. Askeland, The Science and Engineering of Materials, 1989, 192-93.

Donald R. Askeland, The Science and Engineering of Materials, 1989, 385-87.

F. Goesselin, et al., "Double Press-Double Sintering of a Low Alloy Steel Powder for High Performance Applications", Proceedings of the 1992 Powder Metallurgy World Congress, 1992, vol. 5, Advances in Powder Metallurgy & Particulate Materials, 127-140.

Ian Donaldson et al., An Investigation into the Effects of Processing Methods on the Mechanical Characteristics of High Performance Ferrous P/M Materials, 2 Advances in Powder Metallurgy & Particulate Materials, 1995, 22 pages.

Tengzelius, J., "Shrinkage for Higher PM Steel Densities", Met. Powder Rep.1994 28-32.

Y. Takeya, et al., "Surface Rolling of Sintered Gears", SAE Technical Paper Series 820234 (1982), 9 pages.

Yoshiaki Itoh at al., Improvement of Rolling Contact Fatigue Strength of Sintered Steel for Transmission Component, SAE Technical Paper Series 890412 (1989), 9 pages.

P. Hueler, Cost 503 Report: Use of Powder Metallurgy for Load Bearing Applications Such as Gears (1989).

ASM International Handbook Committee (1998). ASM Handbook, vol. 07—Powder Metal Technologies and Applictions. ASM International pp. 663-670, 705-709, and 1058-1064. Online version available at http://www.knovel.com/web/portal/browse/display?_EXT_KNOVEL_DISPLAY_bookid=3111&VerticalID=0.

* cited by examiner

SINTERED GEAR ELEMENT FEATURING LOCALLY SELECTIVE SURFACE COMPRESSION

CROSS-REFERENCE TO RELATED APPLICATIONS

The application is a continuation of International Patent Application No. PCT/EP2006/005468, filed Jun. 8, 2006, which claims the benefit of DE 10 2005 027 048.4, filed Jun. 10, 2005, the complete disclosures of which are hereby incorporated by reference in their entireties.

FIELD OF THE INVENTION

The invention relates to a method and an associated device for producing an at least partially surface-densified metallic toothed element, which comprises a densified sintering material.

BACKGROUND OF THE INVENTION

Sintered toothed elements such as for example powder-metallurgically produced gearwheels are widely used. Sintered materials generally have a lower density compared with conventionally forged materials for example comprising steel. Therefore, surface densification of a sintered workpiece is desirable.

SUMMARY OF THE INVENTION

The present invention is directed to methods and devices for producing metallic toothed elements that are at least partially surface-densified. The invention is further directed to preforms that can be used in these methods, where the preforms of the toothed elements are made of powder metallurgical materials that have been at least partially sintered, preferably fully sintered. The performs are subjected to selective surface densification. In addition, toothed elements produced by these methods are also described.

DETAILED DESCRIPTION OF ILLUSTRATIVE EMBODIMENTS

Figure 1:
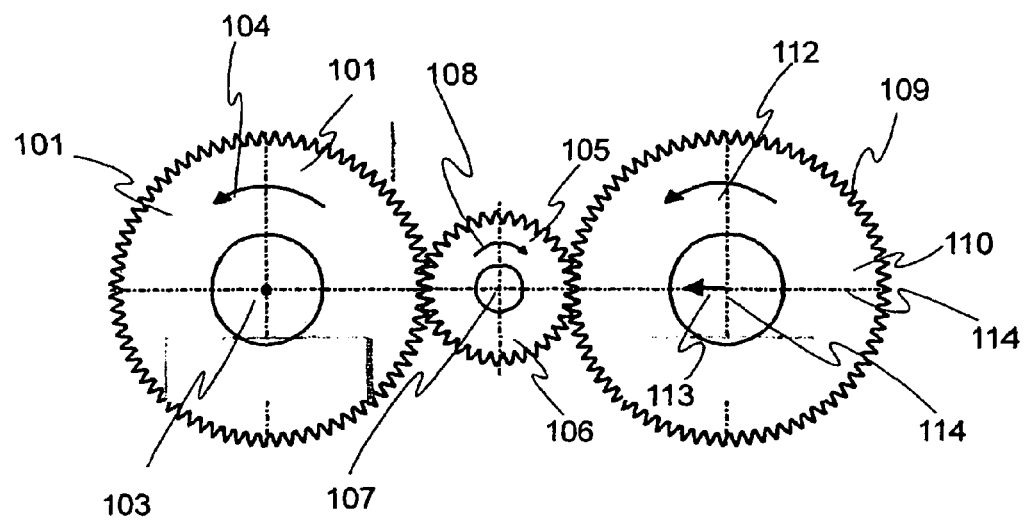
FIG. 1 shows a rolling arrangement.

It is an object of the present invention to enable improvement of the strength profile of a metallic toothed element comprising a sintering material. It is also an object of the invention to simplify the design of tooth systems made from sintering material.

This object is achieved by the methods described herein for producing an at least partially surface-densified metallic toothed element. These methods are accomplished using the performs, toothed elements, and devices of the invention to produce a toothed element of the invention. Also within the scope of the invention are methods for designing an oversize profile for achieving surface densification of a corresponding toothed element and by a computer program product according to the invention.

In a method according to the invention for producing an at least partially surface-hardened metallic toothed element, which comprises a densified sintering material, a preform of the toothed element is produced with a locally selective oversize relative to a final size of the toothed element and rolled to the final size by means of at least one rolling die, the toothed element being densified in locally varied manner at least in the area of at least one flank and/or one root of a tooth of the toothed element to generate a densified outer layer at one surface.

A toothed element is in this case for example a gearwheel, a toothed rack, a cam, a P rotor, a toothed ring, a sprocket or the like. The densified sintering material is produced in particular using powder-metallurgical methods. For example, a metal powder is sintered under pressure in conjunction with heat treatment. Moreover, metal powder is for example injection-moulded together with plastics and is sintered in particular under pressure preferably with heat treatment. To shape a sintered workpiece, use is made in particular of a sintering mould, which exhibits at least virtually the final size of the toothed element to be produced. The workpiece resulting directly from the sintering process is preferably used as a preform. In another variant, however, it is also possible for at least one further surface treatment step to be arranged downstream. In this case, the preform has an oversize which should be regarded as a difference from the final size, the difference preferably being defined point-by-point perpendicularly to the surface.

The rolling die used is for example a roller which is equipped with a tooth system which may be brought into engagement with the tooth system of the toothed element. Such a rolling die is rolled over a surface of the toothed element in particular under pressure. Preferably, two or more such rolling dies are used in particular at the same time. For example, a gearwheel to be produced may be arranged centrally between two rolling dies. By advancing the two rolling dies, surface densification of the sintering material of which the tooth system is made may then be brought about. In general, such a production process is revealed for example by Takeya et al, "Surface rolling of sintered gears", SAE 1982 World Congress, Technical Paper 820234. DE 33 250 37, U.S. Pat. No. 4,059,879, EP 0 552 272 A1, EP 1 268 102 A1, U.S. Pat. Nos. 5,729,822, 5,711,187, 5,884,527, 5,754,937, 6,193,927, EP 0 600 421 A1, GB 2,250,227 also each reveal different production methods, sintering materials, dies, densification sequences and devices for sintered tooth systems which may likewise be adapted for use with the invention. Reference is made to the above documents in the context of this disclosure.

For example, a first rolling die may also be used under a first pressure substantially for rough contour rolling and then a second rolling die under a second pressure may be used to achieve specifically adjusted surface densification.

The locally selective oversize should in particular be so dimensioned that the toothed element is densified in locally varied manner at least in the region of at least one flank and/or one root of a tooth of the toothed element in an outer layer at a surface. Preferably, full density is achieved within the densified outer layer, the full density preferably being understood in relation to the density of a comparable powder-forged tooth. For example, at the core a preform of a sintering material preferably has a density of at least 6.8 g/cm$^3$, preferably at least 7.1 g/cm$^3$ and in particular at least 7.3 g/cm$^3$. In the densified outer layer the preform has, for example, a density of at least 7.7 g/cm$^3$, preferably at least 7.8 g/cm$^3$, which corresponds to the density of a powder-forged preform of the same material. Particularly advantageously, a stress-appropriate strength profile is then achieved. Moreover, a highly stressable sintered tooth system with a locally variable and stress-appropriate density profile is preferably provided. In more highly stressed areas in particular, the density profile may display a greater density level over a relatively large area compared with directly adjacent areas exposed to lower load. By determining an optimised oversize, a tooth system produced in this way may also be economically produced in a small number of operations.

According to one embodiment, the in each case differently densified outer layers are produced together via different oversizes along a flank and/or tooth root of the preform. For example, the depth of the densified outer layer, in each case taken perpendicularly to the surface, exhibits a maximum density for instance at the site of maximum stress. This may be the case half-way up the tooth, for example, and reduce in each case steadily to zero towards the tooth tip and the tooth root. In particular to avoid pitting, provision is made, for example, for particularly high densification to be established in the sintering material in an area between 20% and 30%, in particular between 23% and 25%, below the working circle. However, other profiles may also be provided. When designing a densification profile, a force profile on a tooth flank of the toothed element is taken into account in particular depending on the purpose for which it is to be used. For example, the forces arising at the teeth of a gearwheel in a transmission are used for this purpose, and the resultant equivalent stress profiles below the surface are used. This procedure is also possible with other tooth systems.

It is particularly advantageous if an oversize on a first flank of the tooth is selected to be different from that on a second flank of the tooth. In this respect, a force transmission direction is taken into account depending on the purpose for which a toothed element is to be used. In the case of a gearwheel in a transmission, account is taken, for example, of the fact that, depending on the direction of rotation, different forces arise at the tooth flanks in the direction of rotation than contrary to the direction of rotation. Moreover, different densification may be compensated due to the direction of rotation of a rolling die. Preferably, the oversizes are so selected that, after a densification process, an identical compaction profile results along the first and second tooth flanks.

For example, to prevent stress cracking in a tooth root or tooth base area, a locally densified surface layer is also sought in these areas. It is particularly convenient for an asymmetrical oversize to be selected at a tooth base. For example, a left-hand tooth root area has a different densification depth from a right-hand tooth root. In particular, a preferably constant variation of the outer layer depth may be provided in each case between two teeth through corresponding variation of the oversize.

Preferably, when designing a tooth system a different, in particular asymmetrical oversize is provided not relative to just one flank, but rather preferably relative to two mutually facing flanks. In addition, a different oversize is provided in the tooth root, which is preferably asymmetrical. Tooth flanks and tooth roots of a tooth system may in each case be asymmetrical. An oversize should here be understood not only to mean the provision of extra material, but also to include an undersize. This means that less sintering material is provided in an area than needs to be provided for the final contour after a machining step. The undersize established ensures, for example, that upon displacement of sintering material no undesired raised portions arise. The undersize therefore constitutes an area of a toothed preform to be filled in particular by displacement of sintering material.

There is additionally the possibility of providing different angles of pressure on a tooth system tooth. For instance, the angle of pressure of the one flank of the tooth may differ by at least 15% from the angle of pressure of the other flank of the tooth.

In one embodiment provision is made for 2% to at least 15% higher density to be produced at least 20 μm below a surface of a first tooth flank than at the same level on a second tooth flank. Preferably, a density is achieved on the first flank of the tooth which corresponds at least roughly to the density which is achieved for a powder-forged toothed element, whereas the second flank has a lower density. For example, a density in the range between 7.2 g/cm$^3$ and 7.7 g/cm$^3$ is established on the one flank, while in the corresponding area of the second flank a density of between 7.5 g/cm$^3$ and 7.82 g/cm$^3$ is established. In particular, this again takes account, for example, of different loads on the two tooth flanks as a function of direction of rotation. Preferably, an elasticity and hardness profile is then achieved which is appropriate to requirements. It is additionally preferable that noise development is thereby reduced, for example in a transmission.

Provision is additionally made for a local oversize to be selected to be at least 10% greater on a first flank of the tooth than the oversize on a second flank of the tooth at the same level. In a first variant, this makes it possible, for example, for an identical densification profile to be achieved on the first and second tooth flanks due to exposure to different pressures during densification as a function of direction of rotation. In a further variant, a different densification profile is achieved, for example, on the first and second tooth flanks. Different maximum densities may then in particular be achieved, whose depths as well as their location are adjusted specifically in relation to the height of the tooth system.

It is particularly convenient for a maximum local oversize to amount to at least 15 μm, preferably at least 100 μm and particularly preferably at least 400 μm. If the density of the preform lies in a range of between 7.2 g/cm$^3$ and 7.5 g/cm$^3$, a maximum oversize of between 20 and 150 μm is preferably provided. If the density of the preform lies between 6.7 g/cm³ and 7.2 g/cm³, a maximum oversize of between 50 µm and 500 µm is preferably used. An oversize may locally also be negative, lateral redistribution of material thereby being taken into account, for example. Lateral redistribution may take place due to material flow resulting from a rolling process. In particular, an at least locally negative oversize may be provided which is locally below the final size. The negative oversize amounts preferably to at most 100 µm. According to one embodiment, the negative oversize amounts at most to less than 50 µm and in particular to less than 20 µm. In particular, the maximum negative oversize lies in a range of between 100 µm and 20 µm.

Densification is preferably achieved which reaches a depth of between 1 mm and 1.5 mm at least in one area of a tooth system tooth flank. Densification at the tooth root may be less, on the other hand. According to one embodiment, the maximum densification depth of a tooth flank is greater by at least the factor 6 than a maximum densification depth in an area of the associated tooth root. This makes it possible for the tooth system on the one hand to be sufficiently strong, while on the other hand also retaining a degree of ductility. Tooth breakage is thereby prevented.

In one embodiment of the method, provision is made for the preform and the rolling die to roll towards one another until a final shaping movement is generated between the toothed element produced thereby and the rolling die. This is used for example to produce mutually meshing gearwheels. Preferably, during the rolling process with the rolling die the distance between rolling die and preform is reduced. To this end, in particular a rolling pressure is accordingly established or adjusted. In addition to the possibility of force control, the machine may also be provided with path control. Furthermore, it is possible to provide a combination of force and path control when producing the tooth system. Pure path control may then take place in one part of production while pure force control takes place in another part of production. They may also alternate repeatedly.

In a further embodiment, a cycloid-shaped and/or involute tooth system may arise as a result of the rolling movement between the preform and the rolling die.

In addition to toothed elements in the form of gearwheels, other toothed elements may also be produced. For example, the toothed element takes the form of a cam, in particular as is used, for example, for mechanical actuation of an adjusting device, for example for adjusting a valve or the like. Preferably, an improved strength profile with lower susceptibility to wear is provided by locally varied densification of an outer layer on a flank of a cam.

Further improvement of surface hardening may in particular be achieved in that the method for producing an at least partially surface-densified metallic toothed element includes a thermal and/or chemical surface hardening process.

In a first variant, case hardening is used for example as the thermal and/or chemical hardening process. Preferably, in addition to an increase in hardness a reduction in distortion is here achieved. In a further variant, a carbonitriding process is used, for example. Moreover, a nitriding or nitrocarburizing process and a boronizing process may be used. With these processes in particular, together with heat treatment, a reduction in distortion is likewise achieved. By adjusting the prevailing pressure, hardening may likewise be influenced. For example, a vacuum may be established, in particular if case hardening is undertaken. There is also the possibility of undertaking induction hardening.

According to one embodiment, hardening is only partially performed, for example only in the area of the tooth system.

In a preferred variant, provision is made for a method for producing an at least partially surface-hardened metallic toothed element, which comprises a densified sintering material, to include the steps of "cold or warm pressing, sintering, sizing and surface densification rolling and case hardening". For example, first of all cold pressing of a metal powder takes place in a mould which exhibits at least roughly the final size of the toothed element to be produced. In a second step, the sintering process takes place for example with exposure to heat and with or without exposure to pressure. Preferably, sizing and surface densification then proceed by means of rolling. As has already been mentioned above, sizing and surface densification rolling preferably take place simultaneously using at least two rolling dies. Then hardening, in particular case hardening, may finally take place, this enabling further hardening of the surface.

Further possible method steps or procedures and also closer details of workpieces are indicated hereinafter by way of example. However, the method steps may also be performed using other materials and achieved density values. The usable sintering materials are generally usable as follows for the purposes of the invention, materials which may be used being stated by way of example:

mixed powders (admixed powders): for example iron powder is mixed with other preferably elemental powders. For example:
Ancorsteel 1000+1.5-3.5 w/o Cu+0.6-1.1 w/o graphite+ 0.5-1.2 w/o lubricant
Ancorsteel 1000B+1.5-2.2 w/o Ni+0.4-0.9 w/o graphite+ 0.6-1.1 w/o lubricant partially alloyed powders (diffusion alloyed powders): a powder in which the alloy constituent(s) are bound metallurgically to elemental powder or pre-alloyed powder. For example: Distaloy AB, Distaloy 4600A, Distaloy AE, Distaloy 4800A pre-alloyed powders: powders of two or more elements which are alloyed during powder production, the powder particles being evenly distributed. For example: Ancorsteel 4600V, Ancorsteel 2000, Ancorsteel 86, Ancorsteel 150HP hybrid alloy: prealloyed or partially alloyed powder with elemental or iron-alloyed additions, which are mixed together to achieve the desired material composition. For example:
Ancorsteel 85P+1.5-2.5 w/o Ni+0.4-0.8 w/o graphite+ 0.55-1.1 w/o lubricant addition
Distaloy AE+1.5-2.5 w/o Ni+0.4-0.8 w/o graphite+0.55- 0.95 lubricant addition
Ancorsteel 85HP+1.1-1.6 w/o FeMn+0.35-0.65 w/o graphite+0.6-0.95 lubricant addition The workpiece has a core density of between 6.5 and 7.5 g/cm³. The surface density amounts to more than 7.5 g/cm³. A maximum density is produced to a depth of 0.1 mm.

Starting materials for the preform are metallic sintering powders, in particular pre-alloyed materials, partially alloyed materials or hybrid alloys.

With a pre-alloyed material, cold pressing, sintering in a temperature range between 1100° C. and 1150° C., surface-densification, case hardening and then grinding are performed, in order to achieve a final workpiece shape with tooth system.

With a partially alloyed metallic sintering material, warm pressing is performed at a press temperature in a range of between 50° C. and 80° C., followed by high temperature sintering in a range preferably of between 1250° C. and 1280°

C., surface densification and then vacuum case hardening and honing, in order to achieve the final shape of a workpiece with tooth system.

With a hybrid alloy comprising a sintering material, warm pressing is carried out, in which preferably the powder and the die are heated. Preferably, they are heated to a range of between 120° C. and 150°. This is followed by a sintering step, for example in the form of high-temperature sintering, surface densification and then induction hardening. Post-treatment may be dispensed with, for example.

The preform is powder-forged. This preform is surface-densified at least partially in the area of the tooth flanks and/or of the tooth root. A core density of the workpiece amounts to between 5.7 g/cm$^3$ and 7.7 g/cm$^3$. A surface density in the area of the [sic] amounts to more than 7.8 g/cm$^3$, all pores remaining in this area preferably being closed off at the surface. However, a maximum density may also be produced up to a depth of 1.5 mm.

A production process may proceed as follows: selection of the powder material, cold pressing of the powder material, sintering preferably at a temperature of around 1120° C., then forging, preferably at a temperature of around 1000° C., possible removal of an oxidation layer, surface densification in particular by rolling, surface hardening, in particular case hardening, and then possible partial grinding to a final contour. The method may proceed wholly or partially on a production line.

In a further embodiment, the surface hardening takes the form of vacuum case hardening, which is followed by a honing step for partial areas of the tooth system.

In particular for the production of rotors and oil pump wheels, a preform made from an aluminium-containing material is surface-densified in the area of the tooth flanks and/or the tooth roots. The surface densification in particular results in a final shape of the tooth system. The core density of the workpiece amounts preferably to between 2.6 g/cm$^3$ and 2.8 g/cm$^3$.

The sintering material is warm pressed for example, for example at a temperature of between 40° C. and 65° C., then dewaxed, for example at a temperature of more than 400° C., in particular in a temperature range of between 420° C. and 440° C., then sintered, for example in a temperature range of above 550°, in particular in a temperature range of between 600° C. and 630° C., then homogenised and cooled, for example to a temperature of between 480° C. and 535° C., surface densification then taking place, in particular by rolling. Then, hardening can take place, for example in a temperature range of between 120° C. and 185° C. for a period of between 6 h and 24 h.

The preform is preferably densified along the tooth flanks and the tooth root, in particular two rolling dies being used, the preform being arranged rotatably in the middle thereof. A core density of the workpiece amounts, depending on the material, to preferably between 7.2 g/cm$^3$ and 7.5 g/cm$^3$, the surface density being greater than 7.8 g/cm$^3$ at least in places depending on the material. A maximum density is present in particular to a depth of 1 mm, possibly even therebeyond.

According to one embodiment of the production steps, it is proposed to cold press pre-alloyed material, then to sinter it, in particular in a temperature range of between 1100° C. and 1150° C., to perform surface densification and hardening and optionally partially to grind the surface.

In a further embodiment, a partially alloyed sintering material is warm pressed, in particular in a temperature range of between 50° C. and 90° C., high-temperature sintering is performed, in particular in a temperature range of between 1240° C. and 1290° C., surface densification is performed, followed by vacuum case hardening and optionally then honing.

Another embodiment provides for hot pressing of a hybrid alloy, the powder and the pressing die preferably being heated to a temperature range of between 120° C. and 160° C. A sintering step is followed by surface densification, which is followed by hardening, preferably induction hardening.

It is also possible for pre-sintering to be followed by surface densification and then in turn resintering is provided as a method step in the production of a toothed workpiece. Pre-sintering may take place for example in a temperature range of between 650° C. and 950° C. Resintering may take place for example at a sintering temperature conventional for the material, for example between 1050° C. and 1180° C. There is also a possibility of high temperature sintering, for example in the range of between 1250° C. and 1280° C. Hardening and/or remachining may then optionally follow, for example honing or even grinding.

The preceding pressing may take place under cold, warm or hot conditions, the pressing die and the powder preferably being heated up in the last case. Hot pressing takes place in a temperature range of between 120° C. and 160° C., for example.

In a further development, sinter hardening follows a resintering step. This may optionally be followed by grinding or honing.

In a further production process, the preform is densified at a temperature of above 150° C., in particular above 500° C. For example, the preform may be guided directly from a sintering furnace into a machine for surface densification. The preform may then be at a temperature which is for example above 600° C., in particular even above 800° C. Preferably, the die(s) for surface densification is/are heated, for example to a temperature of around 150° C. According to another embodiment, the surface densification die is cooled, preferably by cooling proceeding inside the die.

In a further production process, surface densification takes place while the preform is being at least partially heated. In particular, heating proceeds to a temperature which makes surface densification easier. Preferably, induction heating is used for this purpose. This is followed by rapid cooling, in order to achieve a martensitic structure. In this way an ausforming process may, for example, be combined with surface densification.

A further development of the invention provides for surface densification to be performed using the widest possible range of methods. In one embodiment in particular, surface densification is performed in a first area using a different method from in a second, different area. Methods which can be used here are shot peening, shot blasting, densification by means of a ball, a roller or by means of another rotatable body, by means of tooth-shaped dies, in particular rolling dies and the like. These methods are also suitable in each case separately from one another for enabling the necessary surface densification.

For example, the tooth root is not densified at all or only slightly with a die with which the tooth flank is also densified. It is possible to densify the surface in one portion to such an extent that only the pores at the surface are closed. Then the tooth root can be treated with another die or surface densification method. In this way, in particular, a different surface densification can be achieved along the tooth flank than at the tooth root. Different surface qualities, for example relating to roughness, can be established in this way, for example. Even the maximum surface densification can be different due to the various techniques. It is also possible for the entire toothed workpiece to achieve surface densification, for example using surface blasting. In particular, even aluminium-containing sintering material or other oxide-forming sintering materials can be treated in this way, since surface densification can additionally also enable removal of an oxide layer.

The invention further relates to a preform for a method for producing an at least partially surface-hardened metallic toothed element, which comprises a densified sintering material, a first and a second flank of a tooth each having different asymmetrical oversizes. Provision is additionally made for a first and a second root area of a tooth to have different, in particular asymmetrical, oversizes.

The invention further relates to a toothed element comprising a metallic sintering material, the toothed element exhibiting locally varied densification at least in the area of at least one flank of a tooth of the toothed element. Preferably, this results in elasticity of the powder-metallurgical material appropriate for many applications together with surface hardening. Particularly preferably, noise reduction is enabled for example in the case of gearwheels during power transmission while at the same time good wear resistance is provided.

In a first variant, the toothed element is a spur-toothed gear.

For improved power transmission in particular, as well as for noise reduction between gearwheels, in a further variant the toothed element is a helical gear. Moreover, in another variant a bevel gear may be provided. In accordance with the description given above, it is expedient for mutually facing tooth flanks of a toothed element to exhibit asymmetrical densification.

Furthermore, it is expedient for asymmetrical densification to be present in a root area. This densification is then adapted in particular to forces arising when the toothed element is used as intended. To prevent stress fracture, provision is made in particular for the depth of the locally densified outer layer to be only such that sufficient tooth elasticity or rigidity is still ensured. Particularly preferably, the depth of the densified outer layer is less in the root area than on a tooth flank.

One special form which the toothed element may take is that of a cam. The above explanations may be applied accordingly thereto, cam flanks taking the place of tooth flanks, for example.

Various compositions may be provided as the material for a toothed element. In a first variant, an iron material is selected as the main constituent of the sintering material and at least one alloy constituent is selected from the group comprising carbon, molybdenum, nickel, copper, manganese, chromium and vanadium. One iron alloy is for example Fe–1.0 Cr–0.3 V+0.2 relative to a reference alloy 15CrNiMo6. A further iron alloy is for example Fe–1.5 Mo+0.2 C relative to 20MnCr5. Another example of an iron-containing alloy is Fe–3.5 Mo relative to 16MnCr5. Likewise, for example, the alloy C 0.2% Cr 0.5% Mn 0.5% Mo 0.5% may be used, the remainder being iron and impurities. Further compositions may also be provided.

Preferably, to reduce the weight of a toothed element, provision is made for aluminium or magnesium to be selected as the main constituent of the sintering material. According to one aspect of the invention, a surface-densified tooth system of sintering material comprises at least 80% aluminium and at least copper and magnesium as further sintering materials. In a first embodiment, silicon is additionally used as a sintering material, for example in a range of from approximately 0.45% to approximately 0.8%, preferably of between 0.6% and 0.75%. However, silicon may also be present in a higher range, for example of between 13% and 17%, in particular between 14.5% and 15.5%. If the silicon content is higher, the copper content in the sintering material is reduced. Thus, a first mixture may comprise for example copper in a proportion of 4% to 5%, silicon in a proportion of 0.45% to approximately 0.8%, magnesium in a proportion of approximately 0.35% to 0.7%, the remainder being at least mainly aluminium. In addition, a pressing aid is preferably added. This may be in a proportion of between 0.8 and 1.8%. For example, a wax, in particular amide wax, may be used for this purpose. A second mixture may comprise for example copper in a proportion of 2.2% to 3%, silicon in a proportion of 13% to approximately 17%, magnesium in a proportion of approximately 0.4% to 0.9%, the remainder being at least mainly aluminium. A pressing aid may again be used, as stated above by way of example. After surface densification, at least one area of the tooth system has a density of for example more than 2.5 g/cm$^3$, preferably up to maximum density. Preferably, a toothed workpiece produced in this way has a tensile strength of at least 240 N/mm$^2$ and a hardness of at least HB90 auf. If the silicon content is higher, the density may in particular amount to even more then 2.6 g/cm$^3$.

In a second embodiment, additionally at least zinc is used as a sintering material in addition to copper and magnesium as additives and aluminium. Preferably, the copper content is in a range of between 1.2% and 2.1%, in particular between 1.5% and 1.65%, that of magnesium between 1.9% and 3.1%, preferably between 2.45% and 2.65%, and that of zinc between 4.7% and 6.1%, in particular between 2.3% and 5.55%. The remainder is at least mainly aluminium. In addition, a pressing aid may here too be used as described above. After surface densification a toothed workpiece made from this mixture preferably comprises at least one area of the toothed system in which the density ranges from at least 2.58 g/cm$^3$ to the maximum density. Preferably, a toothed workpiece produced in this way has a tensile strength of at least 280 N/mm$^2$ and a hardness of at least HB120.

It is particularly convenient for a toothed element to be sintered together with a further functional component, in particular a shaft or a further gearwheel. In particular, this makes it easier to maintain a precise working distance between a plurality of toothed elements, for example in a transmission.

In a further embodiment, the toothed element is a component of a pump. For example, the gearwheel is an involute gear, which is caused to mesh with a further involute gear.

Moreover, the invention relates to a device for producing an at least partially surface-densified toothed element in particular for carrying out an above-described method, with die control adapted to a varying oversize. The device in particular comprises at least one rolling die, which, preferably by means of the adapted die control, may act on the preform in adapted engagement preferably under an adapted pressure and/or with a controlled path. In particular, the device comprises a rolling die with a toothed surface, which may be brought into engagement with the tooth system of the toothed element and rolled thereover.

The present invention further provides a device for producing an at least partially surface-hardened toothed element from a preform consisting at least in a surface region of a sintering material, the device comprising a die which provides compensation of different oversizes at the first and second flanks of a tooth of the preform to be densified by means of rolling motion. The rolling die may here have a contour necessary for shaping, for example an involute tooth system, on just one flank or on both flanks of a tooth. In another variant, however, mutually different oversizes are present on each of the first and second flanks of a tooth of the tooth system of the rolling die. This may be a different involute tooth system, for example.

The invention also relates to a method for designing an oversize to achieve surface densification of a sintered metal toothed element in a rolling process, the oversize being determined iteratively. In a first step, for example, a geometry and in particular a torque and/or a pressure distribution are predetermined. In a further step, for example, rolling die design is defined. Moreover, a preform is established with a locally defined oversize. Selection may for example proceed with reference to data libraries. Such a data library contains experimental density profiles determined with reference to various parameters, for example. Moreover, simulation of the densification or rolling process may take place. To this end, for example, the kinematics of the rolling process are simulated in conjunction with simulation of elastic and plastic properties of the preform and optionally of the rolling die. To simulate the elastic or plastic properties of the preform, reference is made, for example, to continuum mechanics models in conjunction with a discrete solution by means of for example finite element or finite volume methods.

In a preferred embodiment, a geometry of a rolling die is determined iteratively taking account of the oversize. For example, an oversize of an involute tooth system of the rolling die may be determined. An oversize may be determined in corresponding manner for a tooth system other than an involute tooth system.

In a particularly preferred embodiment, in a first step an oversize of a preform of the toothed element, locally varied at least in one area of a flank of a tooth and definable at least point by point, is generated automatically using at least one design set value, in a second step the geometry of a rolling die is automatically generated, in a third step a rolling process and resultant local densification profile for at least one outer layer of the toothed element is simulated and in a fourth step an automatic evaluation of the densification profile generated is compared with a set value and optionally the method is repeated from the first step using at least one variation for the purpose of optimisation, until a stopping criterion is fulfilled. Variation proceeds for example with the aid of an optimisation method. A stopping criterion is for example a tolerance between the desired density profile and the density profile achieved in the simulation. Moreover, a stopping criterion may also consist of exceeding a predeterminable number of iterations.

It is particularly convenient for the design set value to be selected from the group comprising material density, geometry, torque and pressure distribution. Torque should here be understood as the torque arising depending on the purpose for which a toothed element is to be used.

In particular, to prevent material fractures it is convenient for material stress to be simulated at least in the area of densification and in particular to be used for evaluation. This preferably prevents a surface from being brittle as a result of stresses and having a tendency towards stress fracture despite the surface being sufficiently hardened.

Furthermore, it is advantageous for data stored in a database library to be used for variation. In particular, methods may then be used for optimisation and for data analysis for example using neuronal networks. Moreover, features stored in the database are used for example for optimisation using a genetic algorithm.

In a further embodiment, at least one of the steps may be replaced by a set value. Preferably, rolling die geometry is firmly preset. In this way it is possible to take account, for example, of the fact that a rolling die is substantially more complex to modify than for example a preform. Another embodiment provides a reverse procedure. Preferably, a preform or the rolling die for producing a final form as well as the pressing die for producing the preform are calculated on the basis of the final form.

Finally, the present invention provides a computer program product with program code means, which are stored on a computer-readable medium, for carrying out at least one of the above-described methods when the program is run on a computer. A computer-readable medium is for example a magnetic, a magneto-optical or an optical storage medium. Moreover, a memory chip is used, for example. In addition, a computer-readable medium may also be provided by means of a remote memory, for example by means of a computer network.

The computer program may be stored, for example, in a surface densification machine. Calculation may also take place separately from the surface densification machine. However, the machine has a controller, in particular a position- and/or force-controlled controller, into which the coordinates and movement sequences may be input in order to densify the preform.

According to a further aspect the invention, a pressing die shape is provided with which a preform may be pressed from sintering material, this subsequently being surface-densified to yield the final form. This pressing die shape is calculated iteratively. Preferably, this is likewise undertaken on the basis of data from a final contour of the workpiece with its tooth system.

A contact rolling tester may also be provided, which offers the possibility of being able to undertake test rollings for the widest possible range of surface densifications. Furthermore, data may in particular also be determined which may be included after evaluation in the calculation method. For example, characteristic values suitable therefor may be built up from a plurality of measurements. In the process, start values for iterative calculation of preform, die or pressing die may be obtained, for example. The contact rolling tester may also include automated measurement of surface-densified workpieces which have a tooth system.

Further concepts are proposed below, which may be combined with the previously proposed aspects or indeed performed independently thereof.

According to a further concept of the invention, which may be used independently and also together with the further features of the disclosure, a method is provided for producing a tooth system from densified sintering material, a predensified tooth preform being densified by at least 0.05 mm from its surface at least in one area by means of iteratively determined data to yield its final form, and a final form quality in a range of at least $f_{H\alpha}$=4, $F_\alpha$=7 and $f_{f\alpha}$=7 being achieved. Here $f_{H\alpha}$ means the deviation relative to the tooth system, $F_\alpha$ the total deviation and $f_{f\alpha}$ the profile shape deviation of the flanks. The stated values correspond to the DIN classes relating to deviation.

According to one further development, provision is made for iteration to take account of parameters which relate to material behaviour during surface densification of the tooth shape. In one embodiment, iteration for determining a preform is based on input data, which are taken from a final form set value. Preferably, at least one rolling die is used, which is of the same quality as the subsequently produced final form. Iterative determination and the resultant extremely precise treatment during surface densification allow the quality of the die to be transferred to the preform. In particular, the extremely precise surface densification makes it possible for the tooth system to gain this final form quality after surface densification without a further material-removing postmachining step. For example, a toothed workpiece is produced with a core density of at least 7.4 g/cm³ and with a surface density which is at its maximum in at least one area of a tooth flank, the maximum surface density in the area extending to a depth of at least 0.02 μm.

According to a further concept of the invention, which may be used independently and also together with the further features of the disclosure, a method is provided for producing a tooth system from densified sintering material, a predensified tooth preform being densified at least in one area by means of iteratively determined data to yield its final form, and roughness in the area being improved relative to the preform by at least 400%, a surface hardness of at least HB 130 being established. Preferably, a final form core density is established which has a density of at least 7.3 g/cm³, and a surface hardness is impressed thereon which has a convex profile from the surface towards the middle of the final form.

The tooth system of predensified material has a roughness in a first surface-densified area which is at least 400% less than the roughness in a second area, which is surface-densified less or not at all. The roughness $R_2$ amounts for example in the first area to less than 1 μm. In a further embodiment, a surface hardness of at least HV 700 [0.3] is present at the surface of the final form, while at a depth of 0.4 mm from the surface a hardness of at least HV 500 [0.3] is present. Another embodiment has a surface hardness of at least HV 700 [0.3] at the surface of a tooth flank and at a tooth base, a hardness of at least HV 500 [0.3] being present at a depth of 0.6 mm from the surface at the tooth base and a hardness of at least HV 500 [0.3] being present at a depth of 0.8 mm from the surface at the tooth flank. Implementation of surface densification makes it possible purposefully to be able to establish precise densification and also hardening in accordance with desired set values.

According to a further concept of the invention, which may be used independently and also together with the further features of the disclosure, a calculation method is provided for designing a preform of a tooth system of sintering material, data being input into the calculation process which are determined from a predetermined tooth system final form, one or more tooth system stress parameters being determined as a function of at least one use condition of the final form, a local preform oversize being calculated, which correlates with expected surface densification of the preform, and stress on the sintering material below the surface also being included in the calculation.

Preferably, the calculation is additionally based on penetration of the die into the workpiece to be produced, wherein it is possible in particular to take account of the behaviour of the sintering material on penetration and after penetration. For example, the calculation method provides for elastic deformation of the sintering material to be densified to be taken into account. The calculation method may also provide for elastic/plastic deformation of the sintering material to be surface densified to be taken into account. Preferably, the depth of maximum stress under the surface for example when the workpiece is used as a power-transmitting gearwheel is included in the calculation method. The calculation method may additionally allow shrinkage of the sintering material on sintering to be included in the calculation. Empirically determined data may likewise be included in the calculation.

According to a further concept of the invention, which may be used independently and also together with the further features of the disclosure, a calculation method is proposed for designing a surface densification die of a preform of a tooth system of in particular densified sintering material for establishing a predetermined tooth geometry, data determined from the predetermined tooth geometry to be produced being iteratively included for calculation of die machine kinematics taking into account mutually associated machine axes of a workpiece, from which the die to be produced is formed, and of at least one die former, the coupled system coordinates thereof and the relative movement thereof. This makes it possible, instead of using repeated tests, measurement results and adaptation of the workpiece former ultimately to achieve a final form, to bring this about by means of iterative calculation. This takes significantly less time and allows the most varied influencing parameters to be taken into account. Simulation of the design is in particular also enabled, such that for example a mode of action of the die to be produced on a designed preform can be checked by simulation.

According to one embodiment, contact conditions between the workpiece to be produced and the die former between a tip and a root of the tooth system are included in the calculation method. Preferably, maximum stress at the surface in the area of a tooth system root is here also included in the calculation. Moreover, it is possible for maximum stress below the surface in the area of a tooth system flank to be included in the calculation. This method is particularly suitable for sintering materials, but also for steel workpieces or workpieces of other materials.

According to a further concept of the invention, which may be used independently and also together with the further features of the disclosure, a pressing die with a press geometry for producing a tooth system preform of sintering material is proposed, the press geometry having a profile, adapted to surface densification of the tooth system, with at least one raised portion, which generates an indentation at least in the area of the preform tooth system, which indentation may be filled with sintering material on surface densification.

Preferably, the raised portion forms an indentation in the area of a tooth tip of the tooth system on a face of the preform. It is possible, by iterative calculation for example, to determine the height of the raised portion or depth of the indentation as well as further dimensions thereof. Instead of a raised portion on one side, in a further embodiment a raised portion is provided on both sides, in order to bring about an indentation on each of the two faces of the tooth. According to a further development, the raised portion is arranged in an area of the geometry which brings about an indentation on a tooth tip of the preform, the raised portion bringing about a dimension such that the indentation formed at least partially reduces growth of the tooth tip as a result of forming of the preform into the final form by surface densification. In this way, for example, a preform may be calculated and in particular manufactured with at least one indentation on one face of a tooth system for counterbalancing the material piled up on surface densification of a running surface of the tooth system. It is also possible in this way to calculate and in particular manufacture a preform with at least one indentation on a tooth tip of a tooth system in order to reduce growth of the tooth tip in height on surface densification at least of the flanks of the tooth system. The calculation method for determining the geometry of a preform or of a pressing die preferably provides for the geometry to be determined on the basis of data from a final form of the preform and for at least one indentation or raised portion to be calculated, which has the effect, at least partially, of compensating material displacement during surface densification.

According to a further concept of the invention, which may be used independently and also together with the further features of the disclosure, a method for surface densification of a tooth system is proposed, wherein the number of repetitions of a densification movement by a shaping surface densification die of a face of the preform is calculated iteratively.

Preferably, overrolling is calculated iteratively until a predetermined surface density is achieved. In one further development, feed of the shaping die is calculated iteratively. According to one embodiment, overrolling of the preform takes place fewer than 20 times to obtain the predetermined geometry of a final surface densification form. Preferably, overrolling takes place fewer than 10 times. In particular, overrolling of the preform is performed less than 6 times, until a predetermined geometry of a final surface densification form is achieved. It should here be taken into account that surface densification is not yet terminated upon achieving this. Instead, the die is then run over the surface several more times, in particular fewer than 25 times, preferably fewer than 15 times. This ensures accuracy of the surface shape.

According to a further concept of the invention, which may be used independently and also together with the further features of the disclosure, a method is proposed in which reversing rolling is performed on a tooth system of sintering material, in order to densify the preform to yield the final surface densification form. Preferably, the preform is briefly unloaded by the shaping die prior to a change in direction. It has emerged that reversing, i.e. changing the direction of movement, enables the achievement of uniform densification. It was possible, furthermore, to minimise problems still further during manufacture by decreasing the pressure of the die on the workpiece before the change in direction takes place. The die can stay in contact with the workpiece at this point, or it may be briefly detached from the surface.

According to a further concept of the invention, which may be used independently and also together with the further features of the disclosure, surface densification of a workpiece with at least one tooth system of sintering material is proposed, wherein a first surface of the workpiece is densified using a different method from a second surface of the workpiece. Preferably, a first tooth system of the workpiece displays different densification from a second tooth system of the workpiece. In a further development, an internal tooth system of the workpiece undergoes different surface densification from an external tooth system of the workpiece. There is also the possibility of surface-densifying the external tooth system by means of a rolling method while a second face is a bore, which is surface densified using a different method. Preferably, a bore in the workpiece has a hardened surface after surface densification and is then brought into its final form. This allows the bore to be used for a shaft or an axle. Accuracy may be improved in that, after hardening of the tooth system, surface densification takes place.

According to a further concept of the invention, which may be used independently and also together with the further features of the disclosure, a shaft is provided with at least one first and one second tooth system, the first tooth system being rolled from sintering material and surface densified. Below, features relating to the shaft or the tooth systems are stated. The further disclosure relating to the tooth system, the materials, the production steps etc. may be used in particular for further embodiments.

According to one embodiment, the shaft comprises a second tooth system, which is produced by a different method from the first tooth system. This enables a plurality of combinations, which provide different material solutions for each instance of stress. The second tooth system forms a workpiece with the first tooth system, according to a further embodiment. For example, both tooth systems may have been produced together in a pressing machine. Preferably, the first and second tooth systems have been iteratively calculated and produced accordingly. According to one embodiment, production may take place successively, while it may take place simultaneously according to another embodiment. This also applies in particular to further forming steps such as for example surface densification.

In a further development, the second tooth system comprises a hardened surface without surface densification. For certain cases of stress, the density achieved by sintering or the strength inherent in the material used is sufficient. This applies for example to pump applications.

Furthermore, it has proven advantageous for at least the first tooth system to have in each case different flank pitches on at least one tooth at the same level on the tooth. This is advantageous in applications where a main direction of rotation and in particular only one direction of rotation is predetermined for the shaft. The various flank pitches may thereby be designed to be wear- and noise-reducing.

In another embodiment, the second tooth system is forged. It may additionally be surface densified. This tooth system may absorb a greater amount of transmitted power than the first tooth system, for example.

Preferably, the second tooth system is made from a different material from the first tooth system. The second tooth system is made from steel, for example. However, the second tooth system may also consist of a different sintering material than the first tooth system. In addition, the shaft may likewise consist of sintering material. It may be of the same material, for example, as the first tooth system. The shaft may also be formed at least together with the first tooth system, i.e. pressed from powder material, preferably in a common pressing die.

In one exemplary method of producing the above-described shaft, at least the first tooth system is exposed to surface densification and a bore for receiving the shaft is surface-densified and then honed, before the shaft and the first tooth system are connected together. To this end, iterative calculation of a preform of the first tooth system preferably takes place on the basis of a final form of the shaft with the first tooth system.

Such a shaft is preferably used in automotive technology and in transmission construction and domestic appliances.

According to a further concept of the invention, which may be used independently and also together with the further features of the disclosure, a preform is used to produce a tooth system of sintering material, the preform having a negative oversize. Preferably, the negative oversize is arranged at least on one flank of a tooth of the tooth system. In particular, the negative oversize may extend asymmetrically along the flank.

In a further development, a negative oversize is provided on each flank of a tooth. For example, a tooth comprises a first negative oversize on a first flank and a second negative oversize on a second flank at the same level, the first and the second flank extending asymmetrically relative to one another.

Preferably, the negative oversize is arranged between a tip area of the tooth and an oversize on a flank of the tooth. Additionally or alternatively, the negative oversize may be arranged in a corner area of the tooth root. It is additionally possible for the flanks of a tooth to have different pitches.

In addition to an external tooth system or other toothing type, surface densification may also be performed on a tooth system which comprises internal toothing. A surface-densified gearwheel is ultimately obtained from the preform.

A further development provides a method for producing a tooth system from a sintering material in which at least one negative oversize determined by means of iterative calculation is assigned to a preform, which oversize is filled at least in part by displacement of the sintering material during surface densification of the tooth system. Preferably, oversize material adjacent the negative oversize is displaced into the negative oversize. The preform may be surface densified to yield the desired final form, hardening and/or a surface finish-machining being optionally performed. This may take place beforehand or after surface densification. Possible methods of finish-machining are honing and grinding.

Preferably, the negative oversize is designed by means of iterative calculation, in which a simulation of the surface densification using the preform determines whether the adjacent oversize is so designed with regard to shape that the negative oversize may be smoothed to yield the desired final contour. To this end, a machine is made available for calculating and/or implementing surface densification of a tooth system, wherein a calculated kinematics value may be input, by means of which a negative oversize on a flank of the tooth system may be smoothed to a desired final contour using surface densification.

According to a further concept of the invention, which may be used independently and also together with the further features of the disclosure, a method for producing surface densification on a tooth system is proposed in which at least two preforms are simultaneously provided with surface densification in one device.

According to one embodiment, the preforms are arranged on parallel shafts and come simultaneously into engagement with at least one surface densification die.

According to a second embodiment, at least two preforms are arranged on a common shaft and brought jointly into engagement with at least one die for surface densification.

Moreover, a device for producing surface densification on a tooth system is proposed in which at least two preforms may be held in the device for surface densification and simultaneously formed.

Provision is made, for example, for at least one shaft to move in such a way that the two preforms come into engagement with a surface densification die. In one further development, at least three shafts for at least two preforms and at least one die are arranged parallel to one another and form a triangle, wherein at least one of the shafts may be moved towards the other two shafts. In a further embodiment, at least two preforms may be mounted on a common shaft, the die having a greater length than the length of the at least two preforms added together. Preferably, the preforms lie with their end faces against one another. In another embodiment, there is a distance between the preforms, wherein the die projects along the shaft beyond both outer end faces of the preforms.

According to a further concept of the invention, which may be used independently and also together with the further features of the disclosure, a component is proposed with a surface-densified tooth system of sintering material, the component, when viewed over a cross-section, having a gradient relative to the sintering materials used.

Preferably, the component exhibits a gradient which has a step function. The sintering materials are provided with a transition boundary at least in this area. According to one embodiment, this transition boundary is present along the entire face between first and second sintering materials. In another embodiment, such an area has no fixed boundary but rather a gradual transition. In particular, the component may comprise different sintering materials, which extend into one another without a pronounced mixing zone of increasing or decreasing gradient.

In a first further development of the component, the sintering material of the tooth system has a lower core density than the sintering material of an area of the component adjoining the tooth system. In a second further development of the component, the sintering material of the tooth system has a higher core density than the sintering material of an area of the component adjoining the tooth system.

A further embodiment comprises a component which has a first tooth system of a first sintering material and a second tooth system of a second sintering material.

Preferably, a tooth system comprises different flank angles at the same level on one tooth.

For example, a first sintering material may be arranged in an outer area of the component and form the tooth system, and a second sintering material is arranged in an inner area of the component and forms a bore.

Moreover, methods are proposed for producing a surface-densified tooth system on a component, wherein a first sintering material is admitted into a mould before a second sintering material is added, then pressing and sintering take place and only one of the two sintering materials is densified by means of surface densification of the tooth system, while the other sintering material is not modified in any way.

In a further development, a second surface densification is performed, which only affects the as yet un-surface-densified sintering material. Preferably, the first sintering material forms at least one surface of the tooth system flanks and the second material an underlay for the tooth system.

In a further proposed method for producing a surface-densified tooth system on a component, a first sintering material is admitted into a mould before a second sintering material is added, then pressing and sintering are performed and the first and second sintering materials are densified by means of surface densification of the tooth system.

To perform the method, it has proven advantageous for a movement sequence for surface densification to be determined iteratively by taking account of the material behaviour of at least one of the two sintering materials.

In a further development of both methods, relative rotation takes place between the mould, in particular a pressing die, and a sintering material to be introduced, such that the sintering material collects in an outer area of the mould as a function of the speed of relative rotation.

Provision may also be made for the first and at least the second sintering material to be added to the mould with at least a period of time overlap.

Furthermore, reference is made to U.S. Pat. No. 5,903,815. This reveals various sintering materials, sintering material conditions, moulds, principles relating to the processing of two or more sintering materials, applications and method steps. In this regard, reference is made in the context of the disclosure to the content of this publication, which belongs to the disclosure content of this invention.

According to a further concept of the invention, it is proposed also to provide, as part of the production method in addition to the tooth system surface densification step, grinding or honing of the densified tooth flanks and/or tooth roots in particular in the case of a forged gearwheel, chain wheel or toothed ring. Preferably, a density of at least 7.6 g/cm$^3$ is achieved as core density by forging. Surface densification can therefore bring about full densification and/or also tooth system shape precision. In a further development, an oversize within a range of 4 μm to 8 μm of material beyond the final size is available for a material-removing machining step after surface densification. If, instead of forging, pressing, sintering and hardening, in particular case hardening, is performed, preferably 30 μm to 50 μm of oversize is available for honing and 50 μm to 0.3 mm, preferably 0.1 mm to 0.2 mm of oversize is available for grinding after surface densification. Iterative calculation makes it possible to determine the areas and oversizes beforehand and subsequently also to implement them in this way in the method. For a bore in the gearwheel, chain wheel or toothed ring, surface densification is preferably likewise provided, followed by hardening and then preferably honing. For this purpose, the bore may likewise still have an oversize of between 30 μm and 50 μm after surface densification.

A further advantage involves lubrication during surface densification. In addition to using emulsions, oils in particular may also be used as lubricants. This is preferable in the case of hot rolling, for example at temperatures of over 220° C. Furthermore it is proposed to perform hot rolling at a temperature of between 500° C. and 600° C., wherein preferably oil cooling is used, in order on the one hand to provide lubrication and on the other hand to cool the die.

The invention is explained in detail below by way of example with reference to the drawings. However, these illustrated embodiments should not be regarded as limiting the scope and details of the invention. Instead, the features emerging from the figures are not limited to the respective individual embodiments. Rather, these features may be combined in each case with other features indicated in the drawings and/or in the description, including the description of the figures, in each case yielding further developments which are not shown.

FIG. 1 is a schematic view of an exemplary rolling arrangement. A first rolling die 101 with a first tooth system 102 is mounted so as to be rotatable about a first axis 103 in a direction of rotation 104. The first tooth system 102 is in engagement with a second tooth system 105 of a preform 106. The preform 106 is mounted so as to be rotatable about a second axis 107. This results accordingly in a second direction of rotation 108. Moreover, the second tooth system 105 is in engagement with a third tooth system 109 of a second rolling die 110. This second rolling die 110 is mounted so as to be rotatable about a third axis 111 in a third direction of rotation 112. For example, the first axis 103 or the second axis 107 may be fixed axes, while the other two axes may implement a feed movement. For example, the third axis 111 is displaceable in a direction of displacement 113 along a line 114 connecting the first 103, the second 107 and the third axis 111. For example, a sizing rolling process may be undertaken. In said process, the tooth flanks in particular are merely slightly compacted and the tooth bases in particular are not compacted. This results in surface densification in a desired area. During surface densification, on the other hand, it is also possible just or additionally to surface-densify the tooth base. For example, for this purpose, during a rolling process progressive displacement takes place in the direction of displacement 113. In particular, by means of the first and of the second rolling die 101, 110 it is also possible to densify an area of the tooth roots of the preform 106. To adjust the first and/or the second rolling die 110 and to apply a pressure necessary for a rolling process, an adjusting device, not shown, is preferably provided with a transmission. In this way, in particular very high pressures may also be applied.

Figure 2:
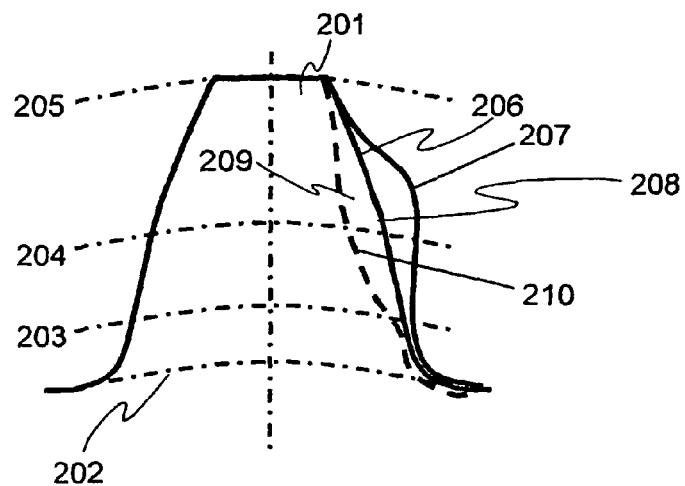
FIG. 2 shows a first tooth.

FIG. 2 shows a first tooth 201 of an associated toothed element, not shown. This toothed element comprises a gearwheel. The geometry of the toothed element or of the first tooth 201 is characterised by a first root circle 202, a first usable root circle 203, a first working circle 204 and a first tip circle 205. On a first flank 206 the first tooth 201 comprises a first oversize profile 207 prior to a rolling process. After completion of a rolling process, a first final size profile 208 is obtained, a first densified outer layer 209 being accordingly obtained. This is shown schematically by a first densification boundary line 210. This line defines the area of the first tooth 201 within which full density has been achieved. Full density is preferably in relation to a density of a comparable powder-forged tooth.

Figure 3:
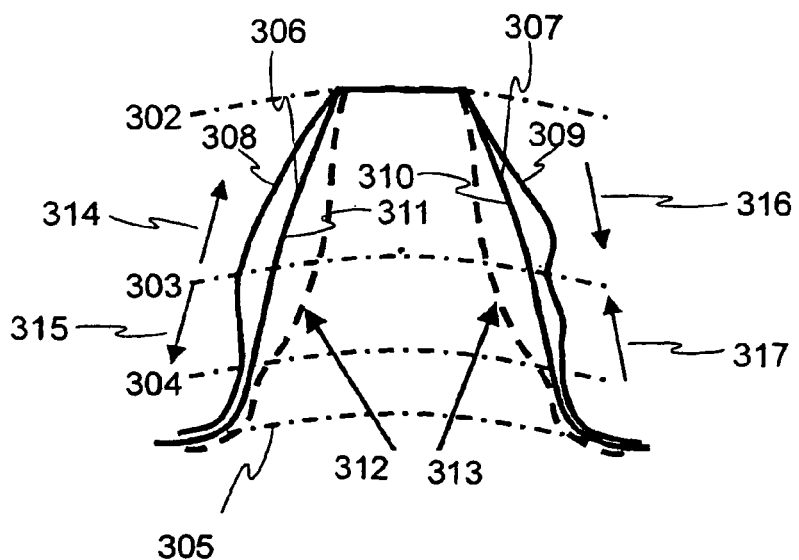
FIG. 3 shows a second tooth.

FIG. 3 shows a second tooth 301 of a toothed element, not shown. This toothed element likewise comprises a gearwheel. Second tooth 301 and gearwheel are characterised by a second tip circle 302, a second working circle 303, a second usable root circle 304 and a second root circle 305. To achieve an identical densification profile on a second flank 306 and a third flank 307, a second oversize profile 308 and a third oversize profile 309 are provided. After a rolling process, a second final size profile 310 is obtained on the second flank 306 and a third final size profile 311 on the third flank 307. Moreover, a second densification boundary line 312 and a third densification boundary line 313 are obtained. As a result of the different forces acting in a direction of rotation due to rolling movement on the second flank 306 and the third flank 307, the second oversize profile 308 and the third oversize profile 309 differ. The different action of forces on the tooth flanks 306, 307 during a rolling process is clarified by the illustrated surface speed directions. At the second flank 306 a first surface speed direction 314 and a second surface speed direction 315 are obtained. These are directed away from the second working circle 303 in the direction of the second tip circle 302 or in the direction of second root circle 305. At the third flank 307, on the other hand, there are obtained a third surface speed direction 316 and a fourth surface speed direction 317, which are directed towards one another.

Figure 4:
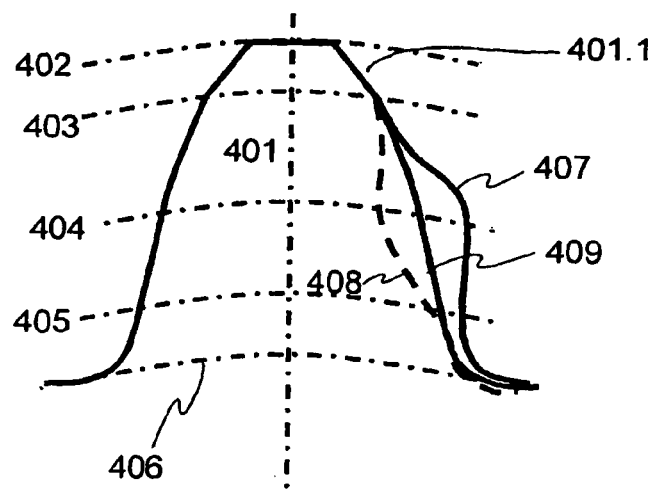
FIG. 4 shows a third tooth.

FIG. 4 shows a third tooth 401 of a toothed element, not shown. This toothed element likewise comprises a gearwheel. Gearwheel and third tooth 401 are again characterised by a third tip circle 402, a usable tip circle 403, a third working circle 404, a third usable root circle 405 and a third root circle 406. The illustrated third tooth 401 comes from a tooth system with a tip relief, preferably in the form of tip rounding. However, other geometries are also possible in this area. In this case, a tooth profile is narrowed in a tooth tip area 401.1 between the third tip circle 402 and the usable tip circle 403. This means that in this area the tooth does not engage with an involute mating tooth system. In this case, an active tooth area is located solely in the area between the usable tip circle 403 and the usable root circle 405 or between the usable tip circle 403 and the third root circle 406. A fourth oversize profile 407 results, after a rolling process, in a fourth densification boundary line 408. Moreover, a fourth final size profile 410 is achieved on the fourth flank 409.

Figure 5:
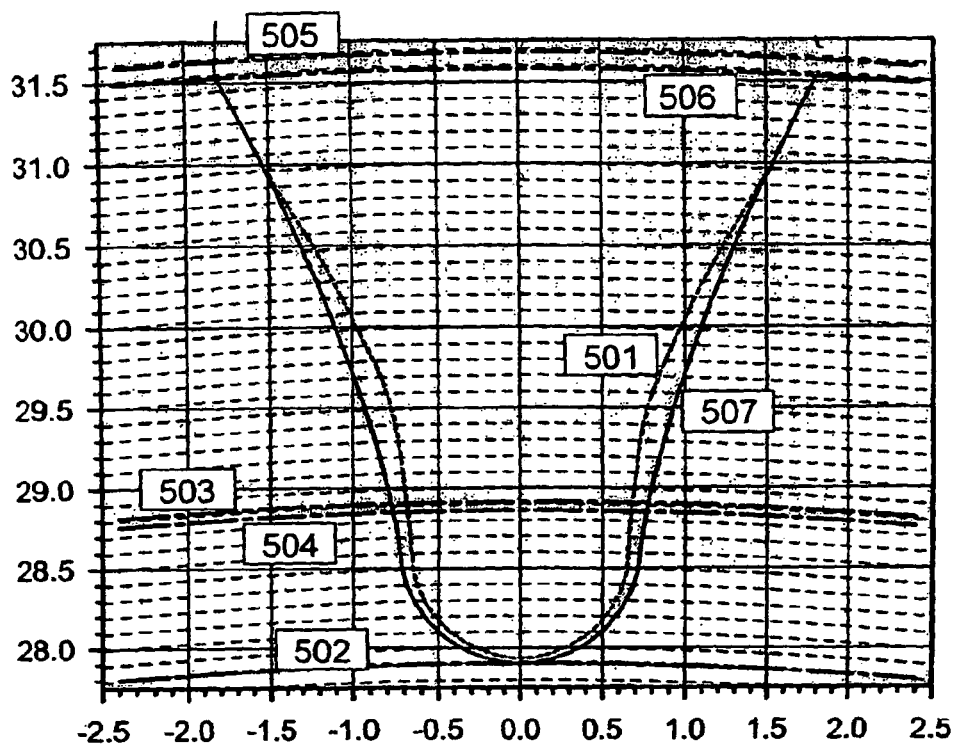
FIGS. 5 to 7 show various oversize profiles for various toothed elements.

FIG. 5 shows an oversize profile between two adjacent teeth of a toothed element, not shown. This toothed element again comprises a gearwheel. Gearwheel and teeth are characterised by a fourth root circle 502, a fourth usable root circle 503 of the preform, a fifth usable root circle 504 of the preform after a grinding process, a fourth tip circle 505 after a milling process and a fifth tip circle 506 after a finishing process. After a rolling process, a fifth final size profile 507 is obtained. On the x-axis, a lateral dimension is plotted in millimeters. On the y-axis, the lateral dimension accordingly perpendicular thereto is likewise plotted in millimeters. The tooth system extends completely in the plane of the drawing.

Figure 6:
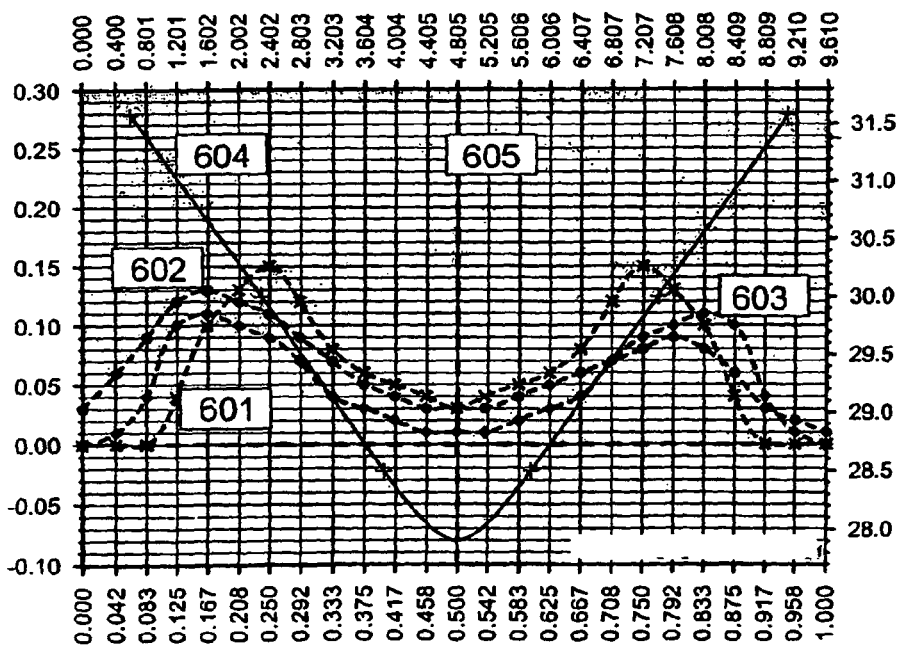

FIG. 6 shows a composition of further oversize profiles. The x-axis shows the standardised pitch circle distance measured along a flank line of a toothed element. This curve relates in each case to the course from a tooth tip of a first tooth to a tooth tip of a neighbouring tooth. On the upper x-axis, the absolute pitch circle distance of the appropriate flank line is accordingly plotted in millimeters. The left y-axis indicates an oversize in millimeters. The right y-axis describes the corresponding radius of the associated tooth system. A sixth oversize profile 601, a seventh oversize profile 602 and an eighth oversize profile 603 are shown. Furthermore, an associated radius 604 of the corresponding tooth system is shown. The sixth oversize profile 601 and the eighth oversize profile 603 are here symmetrical to a tooth base line of symmetry 605. In contrast, the seventh oversize profile 607 is asymmetrical. In the vicinity of the tooth base line of symmetry 605, i.e. in the tooth base area, the oversizes in each case display a local minimum. This promotes a reduction in the risk of stress cracking.

Figure 7:
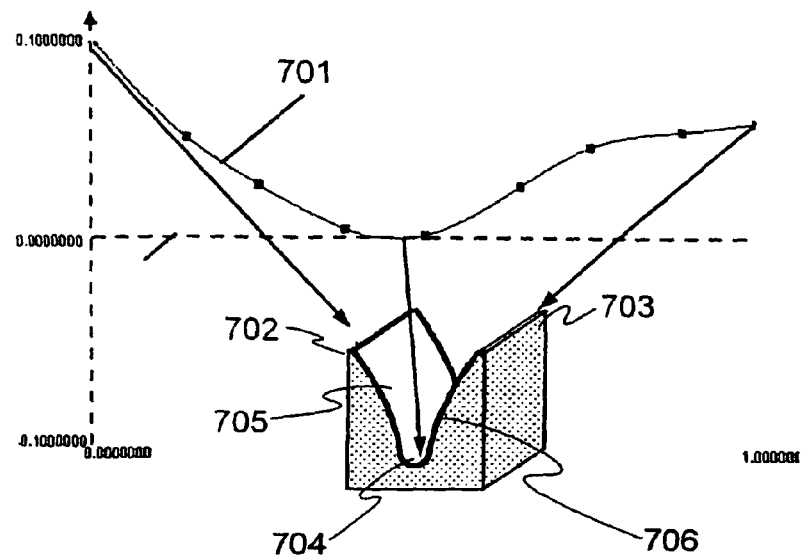

FIG. 7 shows a further oversize profile, a ninth such oversize profile, which extends asymmetrically from a left tooth tip 702 to a right tooth tip 703. As has already been shown in FIG. 6, here too an oversize in the area of a tooth base 704 is smaller than in the area of the fifth 705 and the sixth flank 706. This serves in particular to prevent stress cracking.

Figure 8:
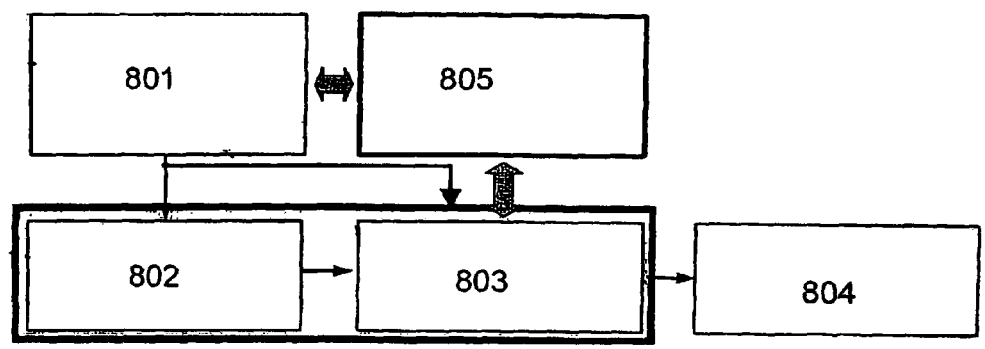
FIG. 8 shows a first method diagram.

FIG. 8 shows a first method diagram. Starting from a target input 801, which includes the geometry, a gearwheel torque to be transmitted and pressure distribution, a rolling die geometry is generated with a first geometry generating module 802. In addition, on the basis of the target input 801 and on the basis of the geometry of the rolling die, preform geometry is generated in a second geometry generating module 803. In a first simulation module 804 a rolling process is simulated. Both the kinematics of the rolling process and the densification process, which is brought about during the rolling process, are simulated. In particular, a redistribution of material, as outlined for example in FIG. 3, is taken into account. Simulation of plastic deformation takes place for example by means of a finite-element method. This may be coupled together with a CAD program. Optionally, a second simulation module 805 may be taken into account for simulating distortion. Into this module are input on the one hand both the target input 801 and the geometry of the preform. On the other hand, the second simulation module 805 additionally allows correction of the determined geometry of the preform. In particular the first geometry generating module 802, the second geometry generating module 803, the first simulation module 804 and optionally the second simulation module 805 may be repeatedly performed in an optimisation loop.

Figure 9:
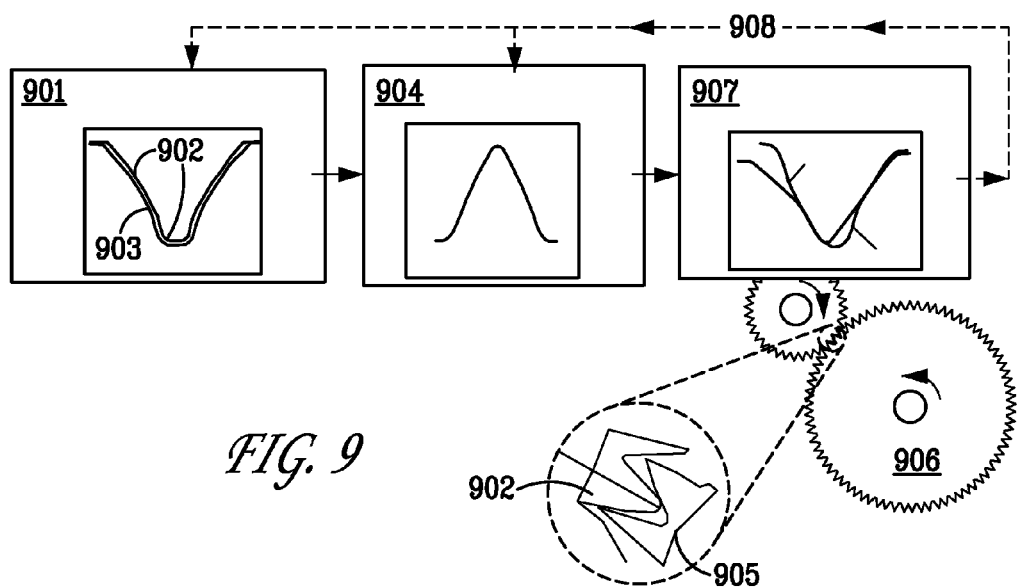
FIG. 9 shows a second method diagram.

FIG. 9 shows a second method diagram. In a first step 901 a ninth oversize profile 902 is generated for a tooth profile 903. Then, in a second step 904, a second tooth profile 905 is generated for a third rolling die 906. Next, in a third step 907 a rolling process is simulated. In the process, the process of rolling the first tooth profile 903 on the second tooth profile of the rolling die 905 and the resultant densification are simulated. Then, the first, second and third steps 901, 904, 907 are optionally repeated in a variation 908.

Figure 10:
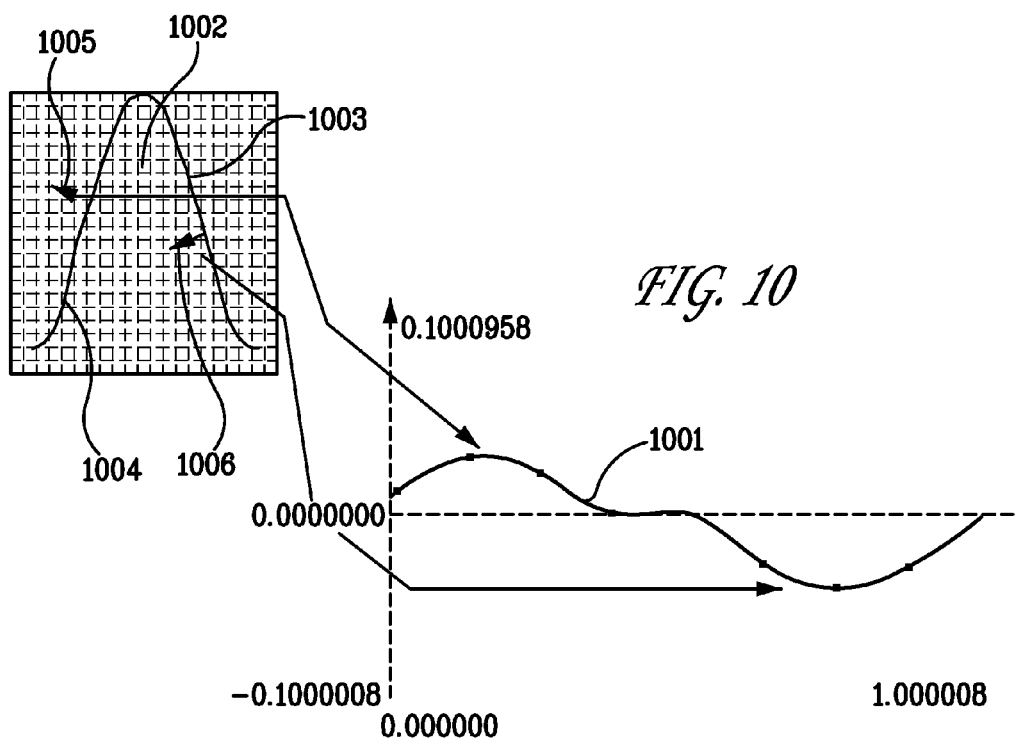
FIG. 10 shows an oversize profile for a toothed element of a rolling die.

FIG. 10 shows an oversize profile of a toothed element of a rolling die, i.e. a tenth oversize profile 1001 of a fifth tooth 1002 of a rolling die, not shown. On a seventh flank 1003 and an eighth flank 1004 of the fifth tooth 1002 there is provided a different oversize. On the seventh flank 1003 there is provided extra material, which is indicated by a first arrow 1005. In contrast, on the eighth flank 1004 a tooth relief is provided, which is indicated by the second arrow 1006. In this example, the oversize relates to a regular profile of an involute tooth system. The asymmetrical embodiments of the two tooth flanks 1003, 1004 make it possible to take account in particular of asymmetrical material loading of a toothed element to be densified thereby. A symmetrical profile may also be achieved, relative to the final shape of the workpiece, for both flanks of a tooth by means of this rolling die, for which reason compensation in the range of from preferably less than 0.1 μm is undertaken.

Figure 11:
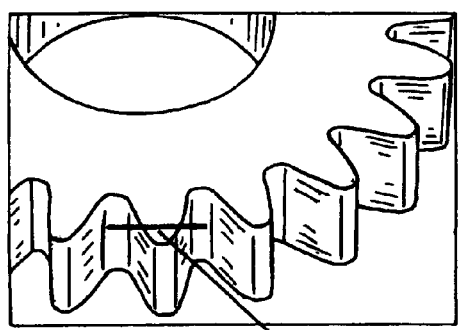
FIG. 11 is a schematic view of a calculated indentation on an end face.
Figure 11:

FIG. 11 is a schematic view of a calculated indentation on an end face of a tooth system. The indentation serves at least to minimise, if not to compensate fully, height- and/or widthwise growth of the tooth caused by the displacement of the sintering material brought about by surface densification. The shape of the indentation is dependent on the oversize and on the dimensions of the tooth. The shape may be optimised iteratively using the calculation method. Simulation allows estimation of the subsequent actual behaviour of the preform.

Figure 12:
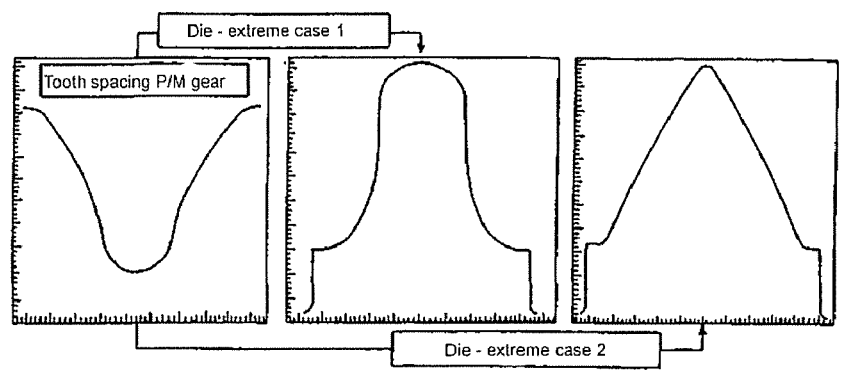
FIG. 12 is a schematic view of calculated extreme die cases.

FIG. 12 shows a schematic view of calculated extreme cases of dies for surface densification, which are calculable. The starting point of the calculation is the left final geometry of the tooth system. By taking account of rolling conditions, oversize parameters and other influencing factors, it is possible iteratively to determine die shapes illustrated in each case in the middle and to the right thereof.

Figure 13:
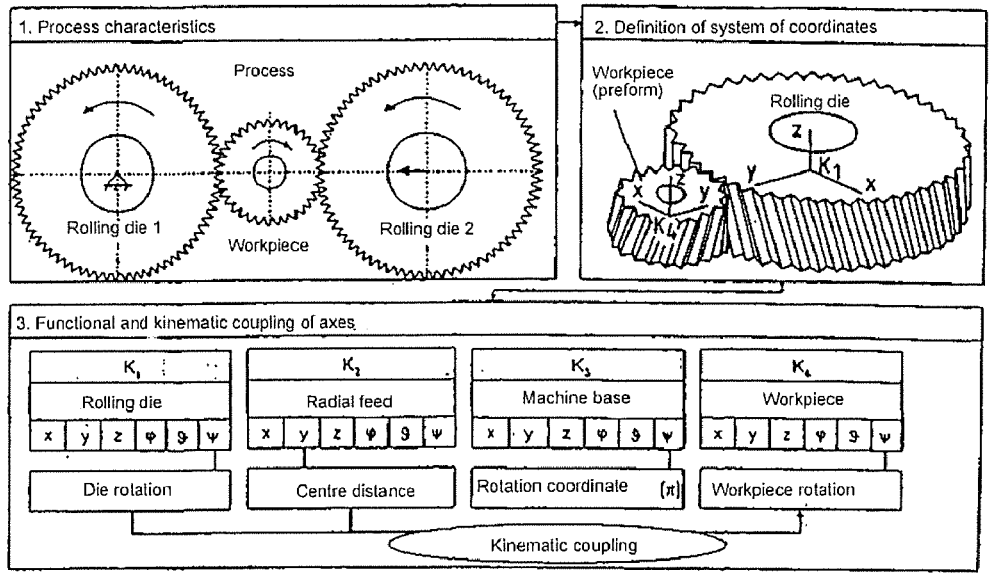
FIG. 13 is a schematic view of a procedure during iterative calculation and associations during simulation.

FIG. 13 is a schematic view of a procedure during iterative calculation and associations during simulation. Starting from the predetermined final data of the workpiece and its tooth system, the machine kinematics may be modelled. Here, for example, the mutually assigned machine axes are taken as the starting point. On the basis of the kinematics and functional associations, it is then possible to undertake optimisation of the die to be designed by means of the available degrees of freedom. In this regard, reference is again made to FIG. 12. The examples illustrated therein have corresponding disadvantages, for example excessively weak root region in the central illustration or excessively pointed tip shape in the right-hand illustration. Using additional influencing parameters such as for example strength considerations and/or stress profiles in the material, it is then possible to perform iteration towards a die contour suitable for the respective requirement profile. For the die for producing the preform, for example, the starting point may be the determined final geometry with the calculated oversizes.

Figure 14:
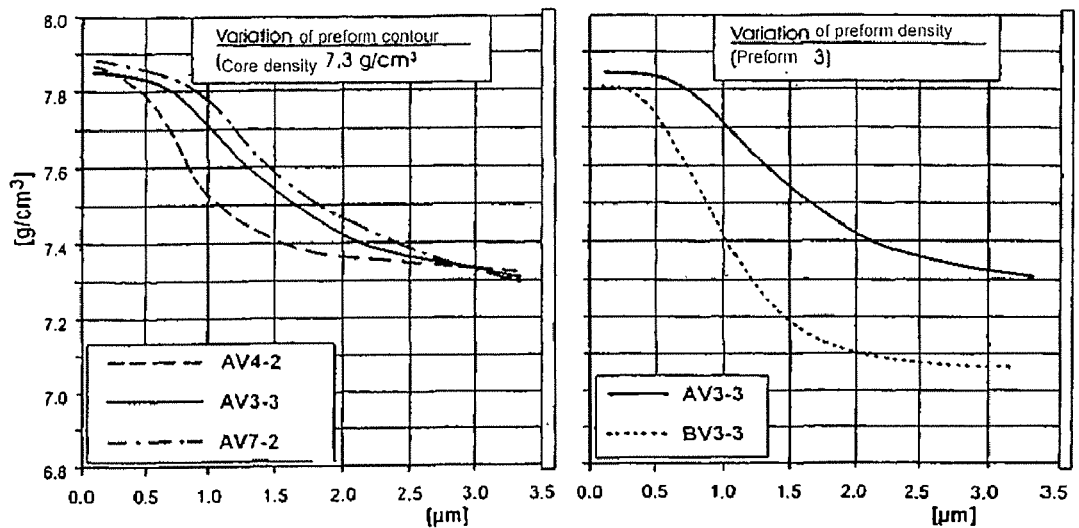
FIG. 14 is a view of density profiles as a function of various starting densities of the preforms used.

FIG. 14 is a view of density profiles as a function of various starting densities of the preforms used. If the density of the preform is modified in its core and as it proceeds outwards, the surface densification profile is influenced. This is clear from the right-hand part of FIG. 14. By modifying the respective preform, the density profile may likewise be significantly influenced after surface densification. Therefore, the starting core density and the shape of the preform constitute important parameters for iteration and calculation.

Figure 15:
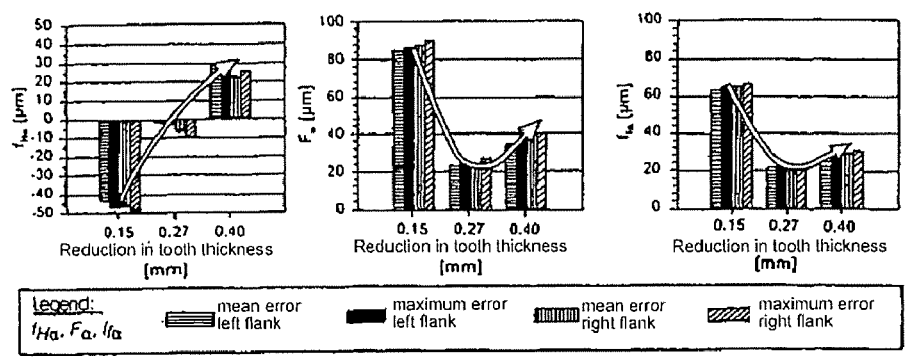
FIG. 15 is an overview of the determined errors, which arise with different surface densification steps and co-characterize the material behaviour.

FIG. 15 is an exemplary overview of the determined errors, which arise with different surface densification steps and co-characterize the material behaviour. The error is indicated in error classes according to DIN 3972 or DIN 3970. An important point when determining a suitable surface densification to be achieved by rolling is the change in profile of the roll-forming die. Using the above calculation method for the preform and the rolling die, it is possible to modify the rolling die on the basis of the determined results. This is illustrated in FIG. 15 using a preform with a core density of 7.3 g/cm³, which was engaged with an unmodified set of rolling dies and was surface-densified. As a function of a feed movement of the rolling die, the geometry of the gearwheel changes. The aim 1s achieve the desired final contour, as has been preset. The illustrations in FIG. 15 show various situations relating to feed movements of various distances. By way of example, on the left a profile angle error is shown, in the middle a complete profile shape error and on the right a shape error. These were measured using the gearwheel produced in each case. Thus, for example, a tooth thickness reduction of 0.27 mm leads to a profile angle deviation corresponding to DIN class 7. In order to achieve the necessary final form of the tooth thickness reduction, however, 0.4 mm feed is necessary. However, this leads to an increase in the respective errors. This means that the final contour manufactured lies outside the necessary quality classes with regard to the other values. Therefore, it is necessary to modify the geometry of the die. Taking the values found as input values, it is then possible to determine a new die, perform the tests again and in this way iteratively determine an optimised die geometry. This calculation makes it possible to determine a final die contour with for example two or even just one iteration.

Figure 16:
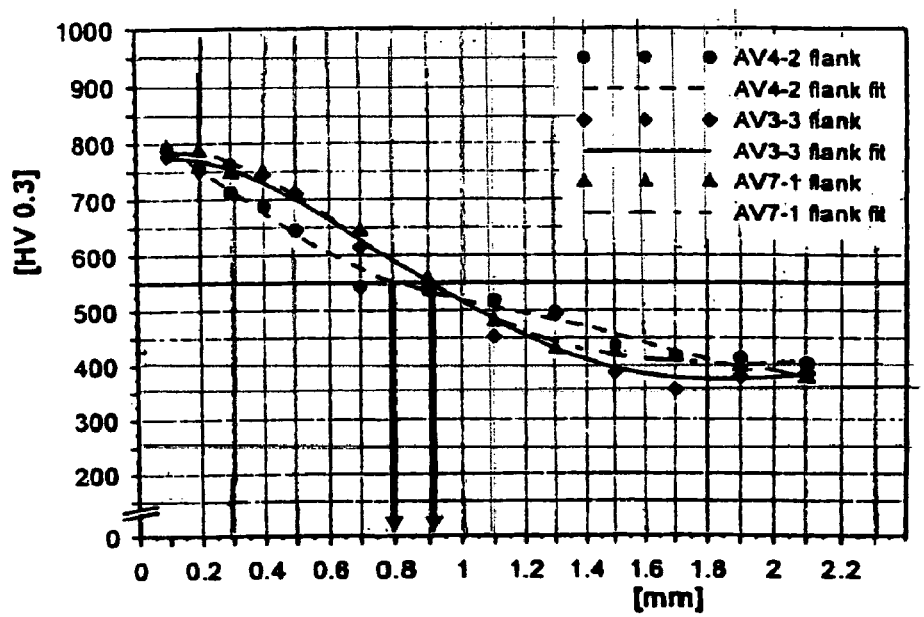
FIG. 16 shows an HV hardness profile over a tooth system flank for different surface densification steps.

FIG. 16 shows an HV hardness profile for a flank of a tooth system plotted over the distance from the surface on the x-axis in [mm]. With different surface densification steps, the hardness profile can be influenced by selecting a suitable oversize and feed movement. For example, the profile may be at least in part convex or indeed concave. As indicated, the preform designated AVA7-1 has a larger oversize than the preform designated AVA4-2. The two have contrary hardness profiles: while in the first portion AVA7-1 has a more convex form until HV 550 is reached, AVA4-2 has a more concave profile. This changes below HV 550.

Figure 17:
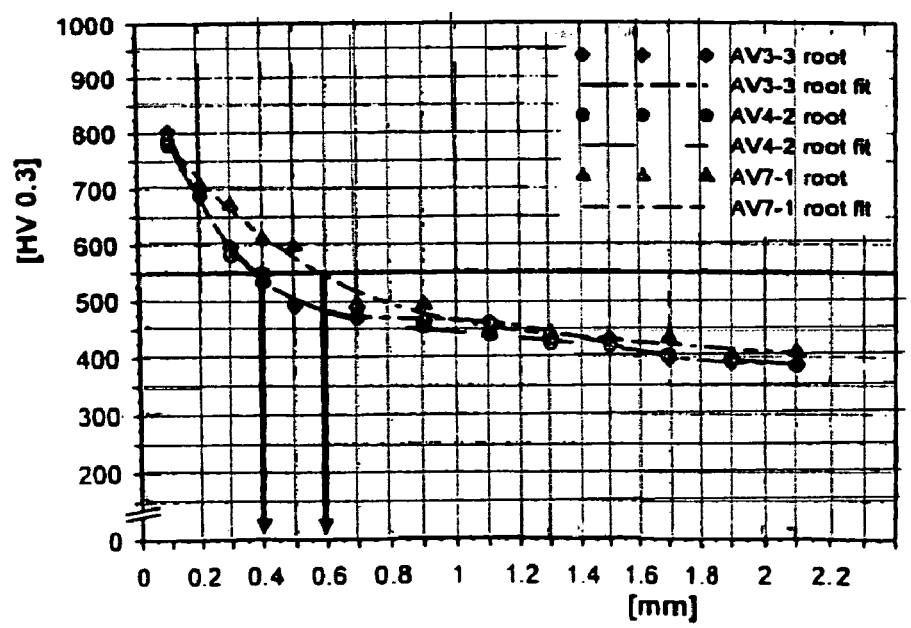
FIG. 17 shows an HV hardness profile in a root area of a tooth system for different surface densification steps.

FIG. 17 shows an HV hardness profile in a root area of a tooth system for different surface densification steps. Due to the smaller oversize at this point compared with the flank oversize and due to the geometry, a different hardness profile is obtained. The hardness starts off more steeply, but then develops into an approximately straight profile with just a slight slope.

Figure 18:
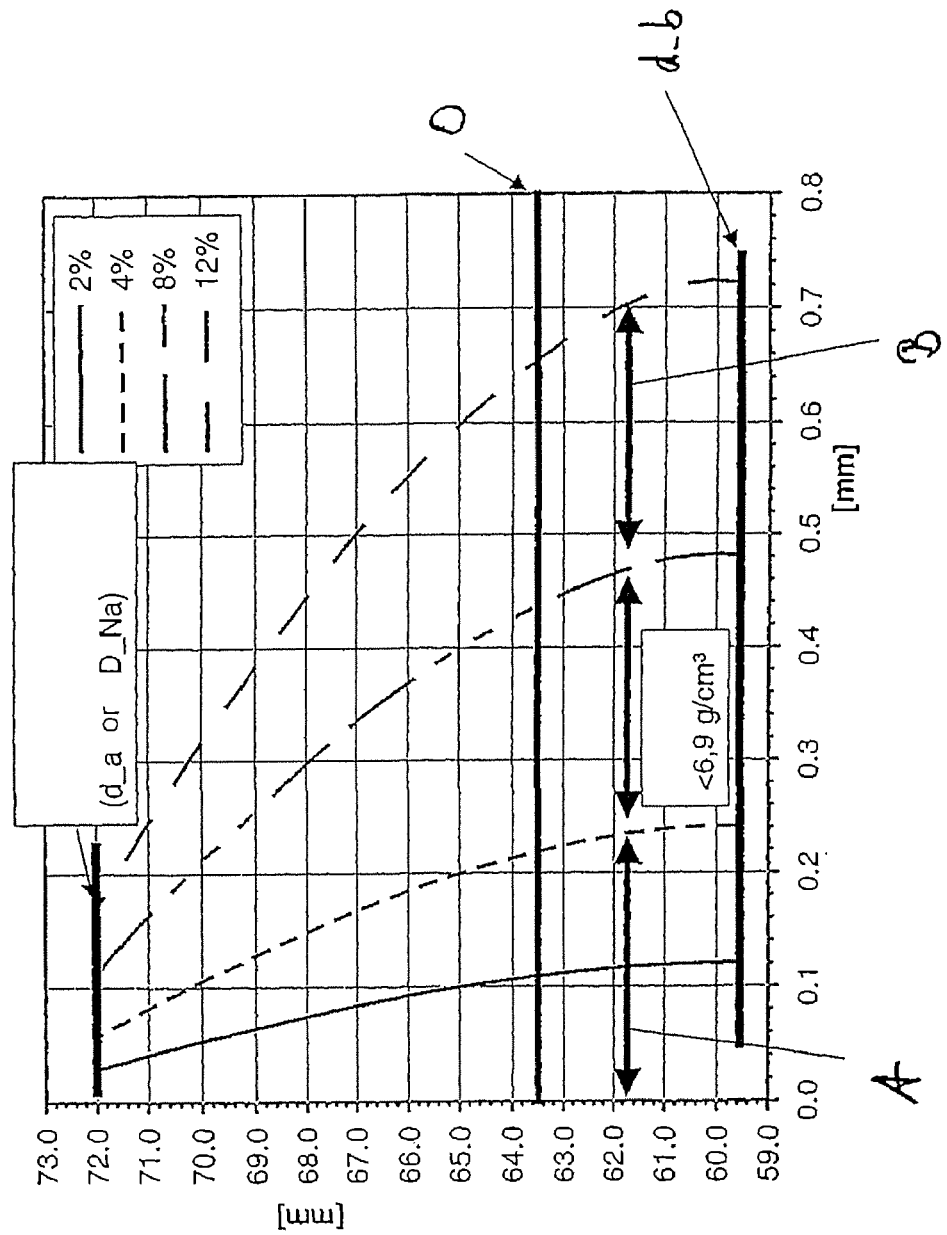
FIG. 18 is a schematic view of different calculated oversize profiles for different densities.

FIG. 18 is a schematic view of different calculated oversize profiles for different densities on the basis of a final tooth thickness. The diameter is plotted on the y-axis. The oversize is indicated on the x-axis. $D\_a$ or $d\_a$ indicates the usable tip circle diameter or the tip circle diameter, 0 is a set value for an oversize preset for example by a value at the reference circle, $d\_b$ is the base circle diameter. A indicates the range of preferred values for the working circle area. B represents a critical area, since die failure may occur there during rolling.

Figure 19:
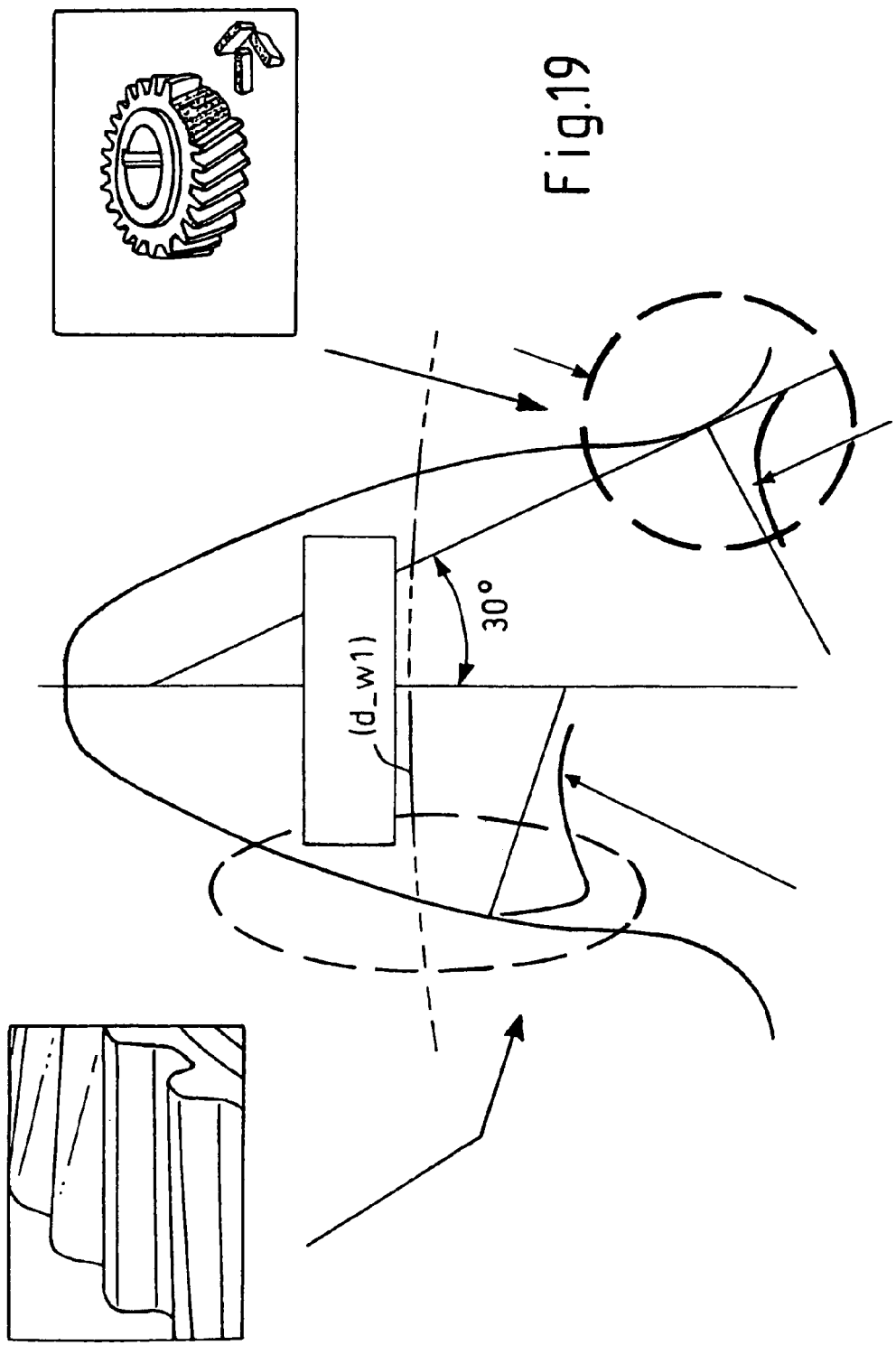
FIG. 19 is a schematic representation of parameters which may be involved in the iterative calculation.

FIG. 19 is a schematic representation of parameters which may be involved in the iterative calculation. In particular, these may be sites of maximum stress. As the left-hand photograph shows, pitting damage may occur on the flank. Therefore, an equivalent stress profile is preferably used, in which the following applies: maximum stress arises under the surface, in particular in an area of negative slip, therefore preferably under the indicated working circle diameter $d\_w1$. The right-hand photograph indicates tooth breakage due to excessive bending load. The consequence for the calculation model is that a site of maximum tooth root stress is determined and taken into account. This may be determined, for example, using the 30° tangent according to DIN or using the Lewis parabola according to AGMA. For the equivalent stress it is preferably assumed that maximum stress arises at the surface.

Figure 20:
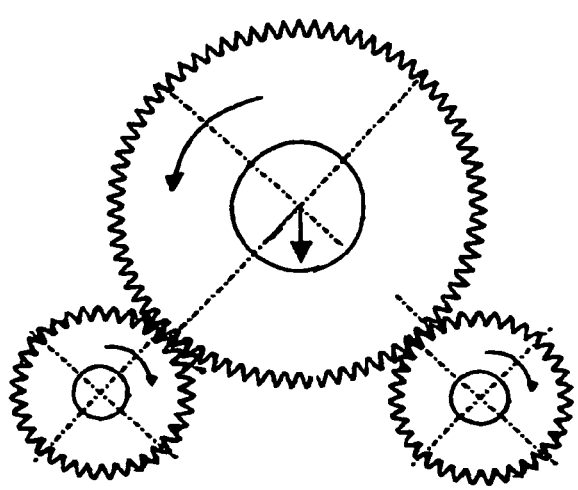
FIG. 20 is a schematic view of a further possibility, in which, for example, at least two preforms can be densified simultaneously. In addition to movement of the die, according to one embodiment the preforms may also move in the direction of die. Furthermore, it is possible for two or more preforms to be arranged on one preform axis.

FIG. 20 is a schematic view of a further possibility, in which, for example, at least two preforms can be densified simultaneously. In addition to movement of the die, according to one embodiment the preforms may also move in the direction of die. Furthermore, it is possible for two or more preforms to be arranged on one preform axis.

The invention may be used, for example, for camshaft gears, planetary gears, sun wheels, drive gears, differential gears, transmission gears, clutch gears, pump gears, spur toothed gears, helical gears, electric motors, internal combustion engines, adjustable mechanisms, external or internal tooth systems, external or internal spur- or helical-toothed cylindrical gears, spur-, helical- or spiral-toothed bevel gears, spiral gears or worm gears and for quick-acting screw thread shaft and quick-acting screw thread hub joints. In a further embodiment, one gearwheel is made of sintered metal. The other may be of plastics or another material, for example. There is also the possibility of at least one of the two gearwheels having a coating which has the effect in particular of minimising noise. Preferably, a skew bevel gearing may also be produced, in order thereby to form a hypoid transmission. In particular, the toothed workpieces may be used in automobile technology, engine technology, transmission technology, control mechanisms, force-transmitting devices, toys, precise mechanical devices, domestic appliances, in particular mobile domestic appliances, and other fields.

What is claimed:

1. A method for producing an at least partially surface-densified metallic toothed gear element comprising:
providing preform of the toothed gear element being produced, said preform comprising densified sintering material and having a locally selective oversize profile relative to a final size of the toothed gear element, the oversize profile being determined iteratively;
iteratively simulating and optimizing the kinematics of a rolling process and a densification process comprising designing a densification profile whereby a force profile on a tooth flank of the toothed gear element is taken into account depending on the purpose of a gear element for which it is to be used and whereby a redistribution of the material is taken into account and whereby the rolling process is simulated in conjuction with simulation of elastic and plastic properties of the preform and optionally of at least one rolling die; and
rolling the preform to the final size of the toothed gear element using the at least one rolling die; wherein the toothed gear element is densified in a locally varied manner in at least one region of at least one flank and/or one root of a tooth of the toothed gear element to produce at least one densified outer layer region at a surface of the toothed gear element.

2. The method according to claim 1, wherein at least two densified outer layer regions are produced.

3. The method according to claim 2, wherein the densified outer layer regions are produced using different oversize profiles, wherein said oversize profile differ along a flank of the preform.

4. The method according to claim 1, wherein the oversize profile on a first flank of the tooth is different from the oversize profile on a second flank of the tooth.

5. The method according to claim 4, wherein the difference in the oversize profile of the flanks of the tooth at the same level are determined as a function of strength requirements.

6. The method according to claim 1, wherein the locally selective oversize profile is an asymmetrical oversize profile at the base of the toothed gear element.

7. The method according to claim 1, wherein 2% to at least 15% higher density is produced at least 10 μm below a surface of a first tooth flank than at the same level on a surface of a second tooth flank.

8. The method according to claim 1, wherein a maximum local oversize profile is at least 20 μm.

9. The method according to claim 1, wherein a maximum local oversize profile is at least 50 μm.

10. The method according to claim 1, wherein a maximum local oversize profile is at least 200 μm.

11. The method according to claim 1, further comprising a negative oversize profile, which is locally below the final size of the toothed gear element.

12. The method according to claim 1, wherein the locally selective oversize profile on a first flank of the toothed gear element is at least 10% larger than the locally selective oversize profile on a second flank of the toothed gear element at the same level.

13. The method according to claim 1, wherein the preform and the rolling die are rolled towards one another until an involuntary movement is generated between the toothed gear element and the rolling die.

14. The method according to claim 1, further comprising a thermal and/or chemical surface hardening step.

15. The method according to claim 1, further comprising the steps pressing, sintering, surface densification rolling, and/or hardening.

* * * * *